United States Patent
Anand

(10) Patent No.: US 12,154,121 B2
(45) Date of Patent: Nov. 26, 2024

(54) ASSESSMENT OF USER PRICE SENSITIVITY

(71) Applicant: Intuit Inc., Mountain View, CA (US)

(72) Inventor: Prateek Anand, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/852,182

(22) Filed: Jun. 28, 2022

(65) Prior Publication Data

US 2023/0419341 A1     Dec. 28, 2023

(51) Int. Cl.
*G06Q 30/0201* (2023.01)
*G06F 16/901* (2019.01)
*G06N 5/01* (2023.01)
*H04L 67/50* (2022.01)

(52) U.S. Cl.
CPC ..... *G06Q 30/0201* (2013.01); *G06F 16/9024* (2019.01); *G06Q 30/0206* (2013.01); *H04L 67/535* (2022.05); *G06N 5/01* (2023.01)

(58) Field of Classification Search
CPC .. G06N 5/01; G06Q 30/0206; G06Q 30/0201; H04L 67/535; G06F 16/9024
See application file for complete search history.

(56) References Cited

U.S. PATENT DOCUMENTS

2014/0222503 A1*  8/2014 Vijayaraghavan ........................... G06Q 30/0201 705/7.29
2020/0167798 A1*  5/2020 Lee ................... G06N 20/20

FOREIGN PATENT DOCUMENTS

AU    2012100880 A4 *  7/2012  ......... G06Q 30/0601
WO   WO-0210961 A2 *  2/2002  ............ G06Q 30/02

OTHER PUBLICATIONS

Wang, Ting, et al. "User adoption and purchasing intention after free trial: an empirical study of mobile newspapers." Information Systems and e-Business Management 11 (2013): 189-210 (Year: 2013).*
Requena, Borja,et al. "Shopper intent prediction from clickstream e-commerce data with minimal browsing information." Scientific reports 10.1 (Year: 2020).*

(Continued)

*Primary Examiner* — Michael J Huntley
*Assistant Examiner* — Adam C Standke
(74) *Attorney, Agent, or Firm* — Paradice & Li LLP

(57) ABSTRACT

Systems and methods for assessment of user price sensitivity using a predictive model are disclosed. An example method may be performed by one or more processors of a retention system and include retrieving traversal sequences including lists of pages users accessed prior to price notifications, labeling the traversal sequences based on whether users terminated sessions upon the notifications, transforming the traversal sequences into graphs based on identifiers assigned to the pages and instances in which users successively accessed pages, defining predictive features suggesting an extent to which identified structural attributes of given graphs affect user price sensitivity, generating model training data based on the labeled traversal sequences and predictive features, determining optimal weights for the predictive features, and generating a model incorporating the optimal weights and trained to predict a likelihood that a user will terminate a session when notified of a price to continue given the user's traversal sequence.

20 Claims, 5 Drawing Sheets

(56) References Cited

OTHER PUBLICATIONS

Bucklin, et al. "A model of web site browsing behavior estimated on click stream data." Journal of marketing research 40.3 (Year: 2003).*

Wang, Ting, et al. "User adoption and purchasing intention after free trial: an empirical study of mobile newspapers." Information Systems and e-Business Management 11:189-210 (Year: 2013).*

* cited by examiner

500

```
┌─────────────────────────────────────────────────────────────┐
│ Determine that a user has been notified of a price to continue a session │
│ after traversing a particular sequence of pages during the session. (510) │
└─────────────────────────────────────────────────────────────┘
                                │
                                ▼
┌─────────────────────────────────────────────────────────────┐
│ Transform the particular sequence of pages into a graph including a │
│ plurality of nodes each mapped to an identifier assigned to one of the │
│ pages and a plurality of edges each representing an instance in which the │
│ user successively accessed the pages assigned the identifiers mapped to │
│ the nodes connected to the edge. (520) │
└─────────────────────────────────────────────────────────────┘
                                │
                                ▼
┌─────────────────────────────────────────────────────────────┐
│ Identify structural attributes of the graph based on the nodes and edges. │
│ (530) │
└─────────────────────────────────────────────────────────────┘
                                │
                                ▼
┌─────────────────────────────────────────────────────────────┐
│ Generate feature values for the particular sequence of pages based on the │
│ structural attributes, the feature values suggesting an extent to which one │
│ or more structural attributes of the graph affect the user's current │
│ sensitivity to price. (540) │
└─────────────────────────────────────────────────────────────┘
                                │
                                ▼
┌─────────────────────────────────────────────────────────────┐
│ Predict, using a predictive model generated using a machine learning │
│ process, a likelihood that, given the feature values generated for the │
│ particular sequence of pages, the user will imminently terminate the │
│ session in response to being notified of the price. (550) │
└─────────────────────────────────────────────────────────────┘
```

*Figure 5*

ASSESSMENT OF USER PRICE SENSITIVITY

TECHNICAL FIELD

This disclosure relates generally to assessment of user price sensitivity, and specifically to assessing user price sensitivity using a predictive model generated using a machine learning (ML) process.

DESCRIPTION OF RELATED ART

Computer-based systems generally provide an interface via which users can interact with the system. For example, a user may be presented with a particular page (or "screen") that includes particular content, and the user may click, tap, or otherwise activate, a link on the particular page that causes the interface to present the user with a different page including different content. Example pages may include an introductory page, a biographical information page, a payment page, or the like. Some systems may include hundreds or thousands of different pages, and may map each page to a different unique identifier (ID), such as in a system database.

In some instances, users may abandon the system, or "churn," during a session. In an attempt to predict when users will churn, some systems may determine which pages users tend to visit before abandoning the system based on the unique page IDs. For example, such systems may convert the page IDs into features (e.g., such as by performing a one-hot encoding or n-gram technique), and train a model to predict user churning patterns based on the specific page IDs. For instance, such models may predict that users will churn after visiting the introductory page (e.g., ID 1), followed by the biographical information page (e.g., ID 2), followed by the payment page (e.g., ID 3). However, if the page IDs change (such as when pages are added or removed, content is updated, or different page ID nomenclature is adopted), the corresponding predictions—now informed by outdated and/or inaccurate information—become inconsistent and unreliable.

Therefore, there is a need for a computer-based system that can generate reliable user churning predictions based on pages accessed by the users, even when page IDs change, pages are added or removed, content is updated, different page ID nomenclature is adopted, and the like.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for training a predictive model to assess a user's price sensitivity. An example method may be performed by one or more processors of a retention system and include retrieving traversal sequences associated with users, each traversal sequence including a chronological list of pages accessed by the associated user during a session and prior to being notified of a price to continue the session, labeling each traversal sequence based on whether the associated user terminated the session upon being notified of the price, transforming each traversal sequence into a corresponding graph including a plurality of nodes and a plurality of edges connecting pairs of the nodes, each of the nodes mapped to an identifier assigned to one of the pages accessed by the associated user during the session, and each of the edges representing an instance in which the associated user successively accessed the pages assigned the identifiers mapped to the nodes connected to the edge, identifying structural attributes of the graphs based on the nodes and edges, defining a number of predictive features based on the structural attributes, each of the predictive features suggesting an extent to which the structural attributes of a graph corresponding to a given user's traversal sequence affect the user's sensitivity to price, generating model training data from the labeled traversal sequences and the defined predictive features, determining, using a machine learning algorithm in conjunction with the model training data and one or more loss functions, optimal weights for the defined predictive features, and generating a predictive model incorporating the optimal weights and trained to predict, given a particular sequence of pages traversed by a user during a session and prior to being notified of a price to continue the session, a likelihood that the user will terminate the session upon being notified of the price.

In some implementations, the traversal sequences are retrieved from a sequence database, where the chronological list of pages is prepended with one or more placeholder pages when a number of the accessed pages is less than a lookback length, a number of the placeholder pages is equal to the lookback length minus the number of the accessed pages, and each of the placeholder pages has a same placeholder identifier. In some instances, assigning a first label to the traversal sequence indicates that the associated user terminated the session upon being notified of the price and assigning a second label to the traversal sequence indicates that the associated user accessed one or more additional pages after being notified of the price. In some aspects, each edge is undirected, each edge is unweighted, and the traversal sequences are transformed into the corresponding graphs using a sequence casting function. In some other aspects, the structural attributes include, for each graph, at least one of a number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, or a number of shortest paths that pass through each node in the graph.

In some other implementations, the machine learning algorithm is non-linear, the predictive features are defined irrespective of the identifiers, and the predictive features are defined based on a combination of at least one of a number of edges in the given graph and a maximum number of edges the graph can contain, where the predictive features include at least a ratio of the number of edges and the maximum number of edges, a number of loops in the given graph and a number of edges between each pair of nodes in the graph, where the predictive features include at least a binary value representative of whether the number of loops or the number of edges between each pair of nodes is greater than zero, a shortest path between each pair of nodes in the given graph, where the predictive features include at least a longest of the shortest paths between nodes, a number of edges along each shortest path in the given graph, where the predictive features include at least an average of the number of edges along each shortest path, a number of closed triplets in the given graph and a total number of triplets in the graph, where the predictive features include at least a ratio of the number of closed triplets and the total number of triplets, a length of each cycle in the given graph, where the predictive features include at least a shortest length among the lengths of each cycle, a highest distance between each node and each other node in the given graph, where the predictive features include at least a lowest of the highest distances between nodes, a number of edges connected to each node in the given graph, where the predictive features include at least a highest number of edges connected to a node, or a number of shortest paths that pass through each node in the given graph, where the predictive features include at least a highest number of shortest paths that pass through a node.

In some aspects, the predictive model incorporates one or more aspects of a gradient boosting model. In some other aspects, the method further includes determining, using validation data associated with prelabeled traversal sequences, an accuracy at which the predictive model can determine a user's sensitivity to price, and training the predictive model, using other traversal sequences from other sessions, to more accurately predict a likelihood that a user will terminate a session upon being notified of a price to continue the session given a sequence traversed by the user during the session. In some instances, the method further includes iteratively validating and training the predictive model until the predictive model's accuracy is greater than a threshold. In some other instances, the method further includes updating the optimal weights based on annotations assigned to the prelabeled traversal sequences.

Another innovative aspect of the subject matter described in this disclosure can be implemented in a system for training a predictive model to assess a user's price sensitivity. An example system may include one or more processors and a memory storing instructions for execution by the one or more processors. Execution of the instructions may cause the system to perform operations including retrieving traversal sequences associated with users, each traversal sequence including a chronological list of pages accessed by the associated user during a session and prior to being notified of a price to continue the session, labeling each traversal sequence based on whether the associated user terminated the session upon being notified of the price, transforming each traversal sequence into a corresponding graph including a plurality of nodes and a plurality of edges connecting pairs of the nodes, each of the nodes mapped to an identifier assigned to one of the pages accessed by the associated user during the session, and each of the edges representing an instance in which the associated user successively accessed the pages assigned the identifiers mapped to the nodes connected to the edge, identifying structural attributes of the graphs based on the nodes and edges, defining a number of predictive features based on the structural attributes, each of the predictive features suggesting an extent to which the structural attributes of a graph corresponding to a given user's traversal sequence affect the user's sensitivity to price, generating model training data from the labeled traversal sequences and the defined predictive features, determining, using a machine learning algorithm in conjunction with the model training data and one or more loss functions, optimal weights for the defined predictive features, and generating a predictive model incorporating the optimal weights and trained to predict, given a particular sequence of pages traversed by a user during a session and prior to being notified of a price to continue the session, a likelihood that the user will terminate the session upon being notified of the price.

In some implementations, the traversal sequences are retrieved from a sequence database, where the chronological list of pages is prepended with one or more placeholder pages when a number of the accessed pages is less than a lookback length, where a number of the placeholder pages is equal to the lookback length minus the number of the accessed pages, and where each of the placeholder pages has a same placeholder identifier. In some instances, assigning a first label to the traversal sequence indicates that the associated user terminated the session upon being notified of the price and assigning a second label to the traversal sequence indicates that the associated user accessed one or more additional pages after being notified of the price. In some aspects, each edge is undirected, each edge is unweighted, and the traversal sequences are transformed into the corresponding graphs using a sequence casting function. In some other aspects, the structural attributes include, for each graph, at least one of a number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, or a number of shortest paths that pass through each node in the graph.

In some other implementations, the machine learning algorithm is non-linear, the predictive features are defined irrespective of the identifiers, and the predictive features are defined based on a combination of at least one of a number of edges in the given graph and a maximum number of edges the graph can contain, where the predictive features include at least a ratio of the number of edges and the maximum number of edges, a number of loops in the given graph and a number of edges between each pair of nodes in the graph, where the predictive features include at least a binary value representative of whether the number of loops or the number of edges between each pair of nodes is greater than zero, a shortest path between each pair of nodes in the given graph, where the predictive features include at least a longest of the shortest paths between nodes, a number of edges along each shortest path in the given graph, where the predictive features include at least an average of the number of edges along each shortest path, a number of closed triplets in the given graph and a total number of triplets in the graph, where the predictive features include at least a ratio of the number of closed triplets and the total number of triplets, a length of each cycle in the given graph, where the predictive features include at least a shortest length among the lengths of each cycle, a highest distance between each node and each other node in the given graph, where the predictive features include at least a lowest of the highest distances between nodes, a number of edges connected to each node in the given graph, where the predictive features include at least a highest number of edges connected to a node, or a number of shortest paths that pass through each node in the given graph, where the predictive features include at least a highest number of shortest paths that pass through a node.

In some aspects, the predictive model incorporates one or more aspects of a gradient boosting model. In some other aspects, execution of the instructions causes the system to perform operations further including determining, using validation data associated with prelabeled traversal sequences, an accuracy at which the predictive model can determine a user's sensitivity to price, and training the predictive model, using other traversal sequences from other sessions, to more accurately predict a likelihood that a user will terminate a session upon being notified of a price to continue the session given a sequence traversed by the user during the session. In some instances, execution of the instructions causes the system to perform operations further including iteratively validating and training the predictive model until the predictive model's accuracy is greater than a threshold. In some other instances, execution of the instructions causes the system to perform operations further including updating the optimal weights based on annotations assigned to the prelabeled traversal sequences Another innovative aspect of the subject matter described in this disclosure can be implemented as a non-transitory computer-readable medium storing instructions that, when executed by one or more processors of a system for training a predictive model to assess a user's price sensitivity, cause the system to perform operations. Example operations may include retrieving traversal sequences associated with users, each traversal sequence including a chronological list of pages accessed by the associated user during a session and prior to being notified of a price to continue the session, labeling each traversal sequence based on whether the associated user terminated the session upon being notified of the price, transforming each traversal sequence into a corresponding graph including a plurality of nodes and a plurality of edges connecting pairs of the nodes, each of the nodes mapped to an identifier assigned to one of the pages accessed by the associated user during the session, and each of the edges representing an instance in which the associated user successively accessed the pages assigned the identifiers mapped to the nodes connected to the edge, identifying structural attributes of the graphs based on the nodes and edges, defining a number of predictive features based on the structural attributes, each of the predictive features suggesting an extent to which the structural attributes of a graph corresponding to a given user's traversal sequence affect the user's sensitivity to price, generating model training data from the labeled traversal sequences and the defined predictive features, determining, using a machine learning algorithm in conjunction with the model training data and one or more loss functions, optimal weights for the defined predictive features, and generating a predictive model incorporating the optimal weights and trained to predict, given a particular sequence of pages traversed by a user during a session and prior to being notified of a price to continue the session, a likelihood that the user will terminate the session upon being notified of the price.

Another innovative aspect of the subject matter described in this disclosure can be implemented as a method for assessing a user's price sensitivity. An example method may be performed by one or more processors of a retention system and include determining that a user has been notified of a price to continue a session after traversing a particular sequence of pages during the session, transforming the particular sequence of pages into a graph including a plurality of nodes each mapped to an identifier assigned to one of the pages and a plurality of edges each representing an instance in which the user successively accessed the pages assigned the identifiers mapped to the nodes connected to the edge, identifying structural attributes of the graph based on the nodes and edges, generating feature values for the particular sequence of pages based on the structural attributes, the feature values suggesting an extent to which one or more structural attributes of the graph affect the user's current sensitivity to price, and predicting, using a predictive model generated using a machine learning process, a likelihood that, given the feature values generated for the particular sequence of pages, the user will imminently terminate the session in response to being notified of the price.

In some implementations, the price to continue the session is a cost to access additional content or features. In some aspects, each edge is undirected and each edge is unweighted. In some other aspects, the structural attributes include at least one of a number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, or a number of shortest paths that pass through each node in the graph.

In some other implementations, the machine learning algorithm is non-linear, the feature values are generated irrespective of the identifiers, and the feature values are generated based on a combination of at least one of a number of edges in the graph and a maximum number of edges the graph can contain, where the predictive features include at least a ratio of the number of edges and the maximum number of edges, a number of loops in the graph and a number of edges between each pair of nodes in the graph, where the predictive features include at least a binary value representative of whether the number of loops or the number of edges between each pair of nodes is greater than zero, a shortest path between each pair of nodes in the graph, where the predictive features include at least a longest of the shortest paths between nodes, a number of edges along each shortest path in the graph, where the predictive features include at least an average of the number of edges along each shortest path, a number of closed triplets in the graph and a total number of triplets in the graph, where the predictive features include at least a ratio of the number of closed triplets and the total number of triplets, a length of each cycle in the graph, where the predictive features include at least a shortest length among the lengths of each cycle, a highest distance between each node and each other node in the graph, where the predictive features include at least a lowest of the highest distances between nodes, a number of edges connected to each node in the graph, where the predictive features include at least a highest number of edges connected to a node, or a number of shortest paths that pass through each node in the graph, where the predictive features include at least a highest number of shortest paths that pass through a node.

In some implementations, the user is classified as at-risk if the predicted likelihood is greater than a threshold, and the user is classified as not at-risk if the predicted likelihood is not greater than the threshold. In some aspects, the method further includes selectively performing one or more preemptive actions to prevent the user from terminating the session based on the user's classification, where the selective performing includes performing one or more preemptive actions to prevent the user from terminating the session responsive to the user being classified as at-risk, and refraining from performing one or more preemptive actions to prevent the user from terminating the session responsive to the user being classified as not at-risk. In some instances, the one or more actions include offering the user a reduced price to continue the session. In some other instances, the method further includes determining whether the user terminated the session upon being notified of the price or accessed one or more additional pages after being notified of the price, annotating the particular sequence of pages based on the determining and the user's classification, where the particular sequence of pages is annotated as false-negative responsive to the user being classified as not at-risk and terminating the session upon being notified of the price, false-positive responsive to the user being classified as at-risk, not being offered a discount, and accessing one or more additional pages after being notified of the price, true-negative responsive to the user being classified as not at-risk, not being offered a discount, and accessing one or more additional pages after being notified of the price, or true-positive responsive to the user being classified as at-risk, immediately being offered a discount, and accessing one or more additional pages after being offered the discount, and selectively providing the particular sequence of pages to at least one of a training engine or an adaptation engine based on the annotating.

Another innovative aspect of the subject matter described in this disclosure can be implemented in a system for assessing a user's price sensitivity. An example system may include one or more processors and a memory storing instructions for execution by the one or more processors. Execution of the instructions may cause the system to perform operations including determining that a user has been notified of a price to continue a session after traversing a particular sequence of pages during the session, transforming the particular sequence of pages into a graph including a plurality of nodes each mapped to an identifier assigned to one of the pages and a plurality of edges each representing an instance in which the user successively accessed the pages assigned the identifiers mapped to the nodes connected to the edge, identifying structural attributes of the graph based on the nodes and edges, generating feature values for the particular sequence of pages based on the structural attributes, the feature values suggesting an extent to which one or more structural attributes of the graph affect the user's current sensitivity to price, and predicting, using a predictive model generated using a machine learning process, a likelihood that, given the feature values generated for the particular sequence of pages, the user will imminently terminate the session in response to being notified of the price.

In some implementations, the price to continue the session is a cost to access additional content or features. In some aspects, each edge is undirected and each edge is unweighted. In some other aspects, the structural attributes include at least one of a number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, or a number of shortest paths that pass through each node in the graph.

In some other implementations, the machine learning algorithm is non-linear, the feature values are generated irrespective of the identifiers, and the feature values are generated based on a combination of at least one of a number of edges in the graph and a maximum number of edges the graph can contain, where the predictive features include at least a ratio of the number of edges and the maximum number of edges, a number of loops in the graph and a number of edges between each pair of nodes in the graph, where the predictive features include at least a binary value representative of whether the number of loops or the number of edges between each pair of nodes is greater than zero, a shortest path between each pair of nodes in the graph, where the predictive features include at least a longest of the shortest paths between nodes, a number of edges along each shortest path in the graph, where the predictive features include at least an average of the number of edges along each shortest path, a number of closed triplets in the graph and a total number of triplets in the graph, where the predictive features include at least a ratio of the number of closed triplets and the total number of triplets, a length of each cycle in the graph, where the predictive features include at least a shortest length among the lengths of each cycle, a highest distance between each node and each other node in the graph, where the predictive features include at least a lowest of the highest distances between nodes, a number of edges connected to each node in the graph, where the predictive features include at least a highest number of edges connected to a node, or a number of shortest paths that pass through each node in the graph, where the predictive features include at least a highest number of shortest paths that pass through a node.

In some implementations, the user is classified as at-risk if the predicted likelihood is greater than a threshold, and the user is classified as not at-risk if the predicted likelihood is not greater than the threshold. In some aspects, execution of the instructions causes the system to perform operations further including selectively performing one or more preemptive actions to prevent the user from terminating the session based on the user's classification, where the selective performing includes performing one or more preemptive actions to prevent the user from terminating the session responsive to the user being classified as at-risk, and refraining from performing one or more preemptive actions to prevent the user from terminating the session responsive to the user being classified as not at-risk. In some instances, the one or more actions include offering the user a reduced price to continue the session. In some other instances, execution of the instructions causes the system to perform operations further including determining whether the user terminated the session upon being notified of the price or accessed one or more additional pages after being notified of the price, annotating the particular sequence of pages based on the determining and the user's classification, where the particular sequence of pages is annotated as false-negative responsive to the user being classified as not at-risk and terminating the session upon being notified of the price, false-positive responsive to the user being classified as at-risk, not being offered a discount, and accessing one or more additional pages after being notified of the price, true-negative responsive to the user being classified as not at-risk, not being offered a discount, and accessing one or more additional pages after being notified of the price, or true-positive responsive to the user being classified as at-risk, immediately being offered a discount, and accessing one or more additional pages after being offered the discount, and selectively providing the particular sequence of pages to at least one of a training engine or an adaptation engine based on the annotating.

Another innovative aspect of the subject matter described in this disclosure can be implemented as a non-transitory computer-readable medium storing instructions that, when executed by one or more processors of a system for assessing a user's price sensitivity, cause the system to perform operations. Example operations may include determining that a user has been notified of a price to continue a session after traversing a particular sequence of pages during the session, transforming the particular sequence of pages into a graph including a plurality of nodes each mapped to an identifier assigned to one of the pages and a plurality of edges each representing an instance in which the user successively accessed the pages assigned the identifiers mapped to the nodes connected to the edge, identifying structural attributes of the graph based on the nodes and edges, generating feature values for the particular sequence of pages based on the structural attributes, the feature values suggesting an extent to which one or more structural attributes of the graph affect the user's current sensitivity to price, and predicting, using a predictive model generated using a machine learning process, a likelihood that, given the feature values generated for the particular sequence of pages, the user will imminently terminate the session in response to being notified of the price.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 shows an illustrative flowchart depicting an example operation for assessing a user's price sensitivity, according to some implementations.

Like numbers reference like elements throughout the drawings and specification.

DETAILED DESCRIPTION

Figure 1:
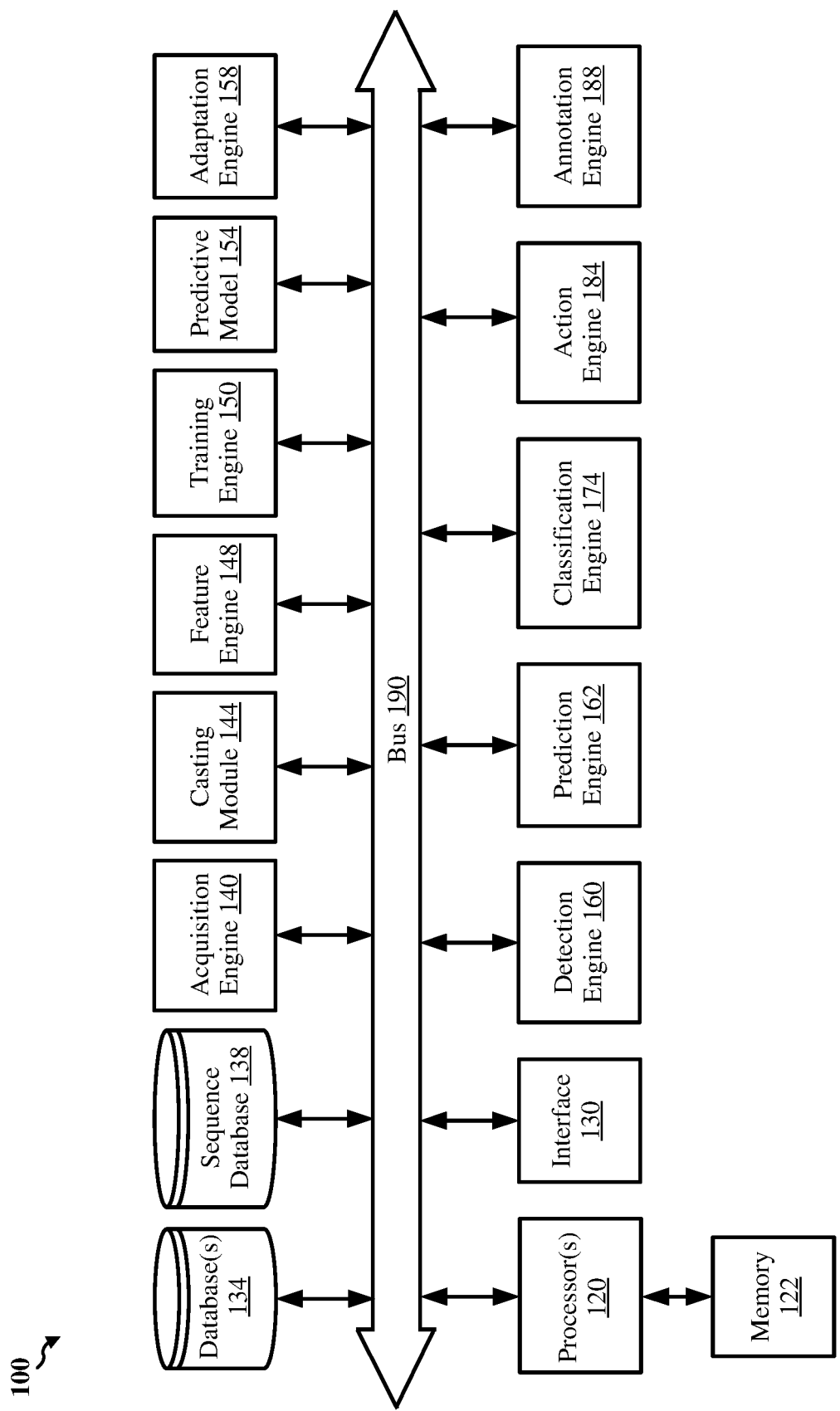
FIG. 1 shows a retention system, according to some implementations.

As described above, there is a need for computer-based systems (such as systems including a user interface) that can generate consistent and reliable user churning predictions based on pages accessed by users, and although some conventional systems may attempt to predict user churning patterns based in part on converting specific, unique page identifiers (IDs) into features, the predictions generated by such systems may quickly become inconsistent and unreliable, such as when page IDs change, pages are added or removed, content is updated, different page ID nomenclature is adopted, or the like.

Implementations of the subject matter described in this disclosure may be used in training a predictive model to assess a user's price sensitivity and/or in using a predictive model trained as such to assess a user's price sensitivity. In some implementations, the predictive model incorporates a number of optimally weighted predictive input features that each suggest an extent to which structural attributes of a graph corresponding to a user's traversal sequence affect the user's sensitivity to price. In some implementations, the predictive model is trained using previous users' traversal sequences labeled based on whether the associated user terminated a session upon being notified of a price to continue the session. In various implementations, the predictive model is used to assess a user's price sensitivity in (at least near) real-time—that is, to predict a likelihood that the user will terminate the session upon being notified of a price to continue the session based on a particular sequence of pages traversed by the user prior to being notified of the price. In some implementations, the system may selectively perform one or more preemptive actions to prevent the user from terminating the session based on the predicted likelihood.

In these and other manners, implementations of the subject matter described in this disclosure may provide one or more benefits such as training a predictive model to assess a user's price sensitivity, labeling traversal sequences, transforming traversal sequences into graphs, defining predictive features based on structural attributes of graphs, generating model training data from labeled traversal sequences and defined predictive features, determining optimal weights for the predictive features using a machine learning algorithm in conjunction with model training data and one or more loss functions, and/or generating a predictive model incorporating the optimal weights and trained to predict a likelihood that a user will terminate a session upon being notified of a price to continue the session given the user's traversal sequence. At least some of such implementations may also provide one or more benefits such as determining an accuracy at which a trained predictive model can predict likelihoods indicative of user price sensitivity, and recursively and/or iteratively further training the predictive model until an accuracy of the predicted likelihoods is greater than a threshold.

In addition, or in the alternative, implementations of the subject matter described in this disclosure may provide one or more benefits such as assessing a user's price sensitivity in real-time with the user being notified of a price to continue the session, generating feature values for a particular sequence of pages traversed by the user prior to being notified of the price to continue the session, and predicting, based on the feature values, a likelihood that the user will imminently terminate the session. At least some of such implementations may also provide one or more benefits such as selectively performing one or more preemptive actions to prevent the user from terminating the session, determining whether the user terminated the session upon being notified of the price or whether the user accessed one or more additional pages after being notified of the price, annotating the particular sequence of pages traversed by the user, and/or selectively providing the annotated sequence of pages to one or more appropriate components for further processing.

Furthermore, implementations of the subject matter described in this disclosure may provide one or more benefits such as increasing user retention, determining that a user has been notified of a price to continue a session, identifying navigational behaviors and/or patterns of a user, identifying structural attributes of graphs corresponding to user traversal sequences irrespective of IDs assigned to the traversed pages, conserving processing and memory resources by using undirected edges and/or unweighted edges in the graphs, predicting accurate likelihoods of users terminating sessions regardless of whether the accessed pages, content, or IDs have changed, selectively performing one or more preemptive actions to prevent the user from terminating the session if the likelihood is greater than a threshold, refraining from performing one or more preemptive actions to prevent the user from terminating the session if the likelihood is not greater than the threshold, consistently formatting traversal sequences based on a lookback length, increasing user satisfaction, enhancing user workflow, and so on.

For purposes of discussion herein, a "system" may refer to any appropriate system for training a predictive model to assess a user's price sensitivity and/or for using a predictive model trained as such to assess a user's sensitivity to price, such as like the systems described below in connection with FIGS. 1-5. For purposes of discussion herein, a "user" or "system user" may refer to a user of any one or more of the systems, and a user may "use the system" by, for example, starting a session and/or accessing one or more pages during a session. A system user may affect system changes, issue system commands, and/or access system information via one or more appropriate sources, such as a device of the user (e.g., a smartphone, a tablet, a personal computer (PC), or a different suitable electronic device), a device communicatively coupled to and/or associated with the system, or the like. The system may "retrieve" data from a data store (e.g., a memory, a database, an index, or the like), an interface (e.g., a user interface), an output of an algorithm, one or more computer-based modules or runtime engines, or any other suitable source.

As used herein, a user being "notified of a price to continue a session" may refer to a user that has traversed a particular sequence of pages during the session, is being notified (in real-time) of a price to continue the session, and may imminently terminate the session in response to being notified of the price, such as if the user does not want to pay a (base and/or additional) price or if the user believes that the price is too high. In some implementations, the price notification may be a particular page (e.g., a "pricing page") and/or a suitable set of display objects at least partially overlaid on a page. In some instances, the user is notified of the price in response to the user activating one or more particular links, such as links to one or more additional pages including premium content and/or features. As used herein, a user "accessing one or more additional pages" may refer to the user paying the price for the premium content and/or features, such as to view additional content, utilize a special form, upgrade to an enhanced session, access bonus material, or the like. In some instances, the price may be an initial cost, such as when there is no cost to begin the session. In some other instances, the price may be an additional cost, such as if the user has already paid one or more costs to begin the session and/or to access one or more additional pages, or if the user has already been notified of a base cost to complete the session. As a non-limiting example, the user may activate a link to a page for viewing a premium video, and the system may notify the user of a price to access the premium video. As another non-limiting example, the user may activate a link to a page for filing a premium tax form, and the system may notify the user of a price to access the premium tax form. As another non-limiting example, the user may activate a link to a page for reading a premium article, and the system may notify the user of a price to access the premium article. As another non-limiting example, the user may activate a link to a page for meeting with a premium expert, and the system may notify the user of a price to access the premium expert.

For purposes of discussion herein, a "session" may generally refer to a duration starting when a user begins interacting with the system (such as by establishing a communication link with the system, logging into the user's account, initiating a system experience, selecting a system feature, accessing one or more particular pages, or the like) and when the user's interaction with the system ends (such as when a system experience is complete, the system closes the session, the user terminates the session, or the like). Non-limiting examples of a system experience may include an editing session during which the system assists the user in generating and/or modifying a creative work, an interview session during which the system assists the user in preparing and/or filing a tax return, a promotional session during which the system assists the user in preparing and/or submitting a resume or curriculum vitae (CV), an information session during which the system provides the user with access to articles or discussions reserved for paid users, a shopping session during which the system assists the user in selecting and/or purchasing one or more items, an entertainment session during which the system assists the user in selecting and/or viewing one or more images or videos, an evaluation session during which the system evaluates and/or assists the user in managing the users' affairs, goals, and/or assets, an education session during which the system assists the user in navigating and/or learning about one or more educational topics, or any other appropriate experience during which a user may selectively access one or more pages (or "screens") during the experience (or "session") prior to being notified of a price to continue the session. As used herein, a user "continuing a session" may include the user accessing one or more additional screens after being notified of the price, where the price is a cost and/or an additional cost (or "premium") to continue the session and/or to access one or more additional pages, such as a payment processing screen, a payment confirmation screen, or one or more pages including premium content.

For purposes of discussion herein, a "page" (or "screen") may generally refer to a data display object including a set of content (e.g., text, hyperlinks, images, or the like) arranged to be delivered (e.g., over the Internet, from an internal memory, or via another appropriate data transfer technique) and displayed to a user (e.g., via a user interface) during a session. A page may generally include one or more links (e.g., arrows, buttons, hypertext, etc.) to different pages, such that a user may choose to navigate to a selected different page by clicking, tapping, or otherwise activating the associated link. As used herein, a user "accessing" a page may generally refer to the system displaying the page to the user via an interface, such as in response to the user activating the link associated with the page, and may also be referred to herein as the user "traversing" or "navigating" to the page, "clicking" and/or "viewing" the page, "being provided" the page, or the like.

For purposes of discussion herein, a "traversal sequence" (or "sequence of pages," "navigation pattern," "navigational behavior," or the like) may generally refer to a list of pages accessed by a user during a session, where a "list of pages" may include a digital indication (e.g., a page ID) for each accessed page (including duplicates), and may generally be stored in chronological order of access, such as in a JavaScript Object Notation (JSON) file or another appropriate data storage object. In some instances, the list of pages may include a number of most recently accessed pages (e.g., before the user was notified of the price to continue the session) equal to a lookback length, as further described below in connection with FIG. 1. For purposes of discussion herein, a "page ID" may generally refer to an attribute of a page (e.g., in the form of metadata) that represents an identifier assigned (such as by the system, an administrator, or the like) to the particular page, in any suitable format, and used by the system to identify the particular page during a session, such as in the list of pages described above and/or in a graph corresponding to the user's traversal sequence, as further described below.

Implementations of the subject matter described in this disclosure may provide one or more benefits including training a predictive model to predict a likelihood that a user will terminate a session upon being notified of a price to continue the session, given a particular sequence of pages traversed by the user (e.g., listed chronologically by page ID) during the session and prior to being notified of the price, where an expected accuracy of the predicted likelihood is the same even when one or more (including all) of the page IDs assigned to the accessed pages are different than when the predictive model was trained or at any previous time, such as if the page IDs have changed, pages have been added or removed, content has been updated, different page ID nomenclature has been adopted, or the like. In other words, the trained model predicts the likelihood independent of the page IDs—rather, as further described below, the predicted likelihood is based on the structural properties of a graph corresponding to the user's traversal sequence, regardless of the actual ID values assigned to the pages (and/or the content therein), and thus the page IDs may be any suitable (including random) values that the system may use to distinguish one page from another during a session. In these and other manners, the predictive model may be trained to predict likelihoods related to user churning based on a relatively small amount of data (i.e., the structural properties of the user's navigational patterns), which may allow the system to, for example, reduce latency and increase transactions per second (TPS) while predicting, in real-time, a reliable likelihood of a user churning due to price, where "real-time" generally refers to the moments (e.g., potentially milliseconds) between when the user is notified of the price to continue the session and when the user either terminates the session or continues the session, such as by accessing one or more additional pages, making the payment, completing the session, or the like.

For purposes of discussion herein, a "graph" may generally refer to a data structure transformed (or "casted") from a user's traversal sequence, and may include a plurality of nodes (or "vertices") each corresponding to one of the accessed pages, and a plurality of edges each connecting two of the nodes and representing an instance in which the user accessed the two pages associated with the nodes in succession. In other words, the graph represents patterns in which the user navigates between pages without regard to the content on the pages or the particular IDs assigned to the pages. It is to be understood that the system may identify each node of a graph using any suitable identifier (e.g., ID=248) different than the identifiers used to identify any other node of the graph (e.g., ID=D6, ID=#info, or any other suitable value), even if the identifiers have not been used to identify the associated pages at any previous time.

For purposes of discussion herein, "structural properties" (or "structural attributes") of a graph may generally refer to properties of the graph that are preserved under all possible isomorphisms of the graph, rather than of a specific drawing or representation of the graph. In some implementations, the structural properties include a number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, and a number of shortest paths that pass through each node in the graph. It is to be understood that the above list of structural properties is a non-limiting exemplary combination of structural properties that may be identified for a graph, and that, in some other implementations, different combinations of suitable (i.e., preserved under all possible isomorphisms) structural properties may be identified for a graph.

As used herein, a "shortest path" (or "distance") between two nodes generally refers to a number of edges between the two nodes (i.e., a number of instances that the user successively accessed the two pages represented by the two nodes), and a "highest distance" (or "eccentricity") of a particular node generally refers to the number of edges between the particular node and the node in the graph that shares the highest number of edges with the particular node. As a non-limiting example, a user may traverse from a first page ("page 1") to a second page ("page 2"), then from page 2 to page 1, page 1 to page 2, page 2 to page 1, and then again to page 1 (e.g., 1, 2, 1, 2, 1, 1). For this example, the graph may include two nodes (e.g., a first node representative of page 1 and a second node representative of page 2), one edge connecting the first node to the first node (i.e., a "loop"), and four edges connecting the first node to the second node, i.e., a "shortest path" (or "distance") of length 4 between the first node and the second node. As further used herein, a "diameter" of a graph (or a "maximum eccentricity" among the nodes in the graph) generally refers to the number of edges connected to the node (or nodes) through which the highest number of edges pass through, i.e., a longest of the shortest paths between nodes. As further used herein, a "radius" of a graph (or a "minimum eccentricity" among the nodes in the graph) generally refers to the number of edges connected to the node (or nodes) through which the lowest number of edges pass through, i.e., a shortest of the shortest paths between nodes.

As used herein, a "cycle" generally refers to at least three nodes connected (by edges) in succession, where the first node and the last node of the cycle are the same, where no other two nodes of the cycle are the same, and where a "length" of the cycle is the number of edges included in the cycle (i.e., at least three). As further used herein, a "triplet" generally refers to a cycle including exactly three nodes, where an "open triplet" includes exactly two edges (a first edge connecting a first node to a second node, and a second edge connecting the second node to a third node), and where a "closed triplet" includes exactly three edges (a first edge connecting a first node to a second node, a second edge connecting the second node to a third node, and a third edge connecting the third node to the first node). As a non-limiting example, a user may traverse from a first page to a second page, to a third page, to a fourth page, and then back to the first page (e.g., 1, 2, 3, 4, 1). For this example, the graph may include one node for each page (node 1, node 2, node 3, and node 4), four edges (a first edge connecting node 1 to node 2, a second edge connecting node 2 to node 3, a third edge connecting node 3 to node 4, and a fourth edge connecting node 4 to node 1), one cycle of length 4 (1, 2, 3, 4, 1), zero closed triplets, and a total of four (open) triplets (triplet 1, 2, 3; triplet 2, 3, 4; triplet 3, 4, 1; and triplet 4, 1, 2). As further used herein, a "girth" of a graph generally refers to the number of nodes in the cycle of the graph that includes the least number of nodes, which may also be referred to herein as "a shortest length among the lengths of each cycle" or a "shortest cycle" in the graph.

Various implementations of the subject matter disclosed herein provide one or more technical solutions to the technical problem of improving the functionality (e.g., speed, accuracy, etc.) of computer-based systems (e.g., including a user interface), where the one or more technical solutions can be practically and practicably applied to improve on existing techniques for training predictive models to assess user price sensitivity, such as by using a machine learning algorithm in conjunction with generated model training data to train a predictive model to predict a likelihood that a user will terminate a session upon being notified of a price to continue the session based on the structural attributes of a graph corresponding to the user's traversal sequence prior to being notified of the price. In addition, or in the alternative, various implementations of the subject matter disclosed herein provide one or more technical solutions to the technical problem of improving the functionality (e.g., speed, accuracy, etc.) of computer-based systems (e.g., including a user interface), where the one or more technical solutions can be practically and practicably applied to improve on existing techniques for assessing a user's price sensitivity using a trained predictive model, such as by using a predictive model generated using a machine learning process to predict, in (at least near) real-time with a user being notified of a price to continue a session, a likelihood that, based on structural attributes of a graph corresponding to the user's traversal sequence during the session and prior to being notified of the price, the user will imminently terminate the session in response to the price. Various aspects of the present disclosure provide specific steps describing how these specific results are accomplished and how these specific results realize a technological improvement in computer functionality by means of a unique computing solution to a unique computing problem that did not exist prior to computer-based systems that can use machine learning processes to generate and/or train predictive models to generate user churning predictions and/or to use a trained predictive model to generate user churning predictions in real-time, neither of which can be performed in the human mind or using pen and paper. As such, implementations of the subject matter disclosed herein provide specific inventive steps describing how desired results are achieved and realize meaningful and significant improvements on existing computer functionality—that is, the performance of systems for use in the evolving technological field of ML-based user retention systems.

FIG. 1 shows a retention system 100, according to some implementations. The retention system 100 may also be referred to herein as "the system 100." Various aspects of the system 100 disclosed herein may be generally applicable for training a predictive model to assess a user's price sensitivity, assessing a user's price sensitivity using a trained predictive model, or both. The system 100 may include at least one of one or more processors 120, a memory 122 coupled to the processor 120, an interface 130, one or more databases 134, a sequence database 138, an acquisition engine 140, a casting module 144, a feature engine 148, a training engine 150, a predictive model 154, an adaptation engine 158, a detection engine 160, a prediction engine 162, a classification engine 174, an action engine 184, and an annotation engine 188. In some implementations, the various components of the system 100 are interconnected by at least a data bus 190, as depicted in the example of FIG. 1. In some other implementations, the various components of the system 100 are interconnected using other suitable signal routing resources. While the system 100 and the examples herein are generally described with reference to assessing user price sensitivity using machine learning (ML), aspects of the present disclosure may be used to perform other retention-based and/or sensitivity assessment techniques, among other suitable tasks.

It is to be understood that, in some implementations, the system 100 may be configured to train a predictive model to assess a user's price sensitivity, as further described below in connection with the acquisition engine 140, the casting module 144, the feature engine 148, the training engine 150, and the adaptation engine 158—as well as with respect to FIGS. 2-3—and that in some implementations, the system 100 may not be configured to assess a user's price sensitivity in real-time, and thus may not include one or more of the detection engine 160, the prediction engine 162, the classification engine 174, the action engine 184, or the annotation engine 188. It is further to be understood that, in some other implementations, the system 100 may be configured to use a trained predictive model to assess a user's price sensitivity, as further described below in connection with at least the detection engine 160, the prediction engine 162, the classification engine 174, the action engine 184, and the annotation engine 188—as well as with respect to FIGS. 4-5—and that in some implementations, the system 100 may not be configured to train a predictive model to assess a user's price sensitivity, and thus may not include one or more of the acquisition engine 140, the casting module 144, the feature engine 148, the training engine 150, or the adaptation engine 158. It is further to be understood that, in yet other implementations, the system 100 may be configured to train a predictive model to assess a user's price sensitivity and configured to assess a user's price sensitivity (e.g., in at least near real-time) using the trained predictive model.

The processor 120 may include one or more suitable processors capable of executing scripts or instructions of one or more software programs stored in system 100, such as within the memory 122. The processor 120 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 120 may include a combination of computing devices, such as a combination of a DSP and a microprocessor, a plurality of microprocessors, one or more microprocessors in conjunction with a DSP core, or any other suitable configuration.

The memory 122, which may be any suitable persistent memory (such as non-volatile memory or non-transitory memory) may store any number of software programs, executable instructions, machine code, algorithms, and the like that can be executed by the processor 120 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The interface 130 may be one or more input/output (I/O) interfaces for receiving input data from a user, outputting data to a user, presenting information to a user, detecting an action of a user, receiving a command from a user, determining a selection made by a user, prompting a user to perform one or more actions, or the like. As non-limiting examples, the interface 130 may be used to begin a system session with a user, present pages or links to pages to a user, detect that a page has been selected or that a link has been activated by a user, identify and/or generate a list of pages accessed by a user, present a notification to a user, determine that a user has received a notification, determine that a user has accessed one or more pages after receiving a notification, present an offer to a user, determine that a user has terminated a session upon receiving a notification, or the like. The interface 130 may also be used to provide or receive other suitable information, such as computer code for updating one or more programs stored on the system 100, internet protocol requests and results, or the like. An example interface may include a wired interface or wireless interface to the internet or other means to communicably couple with user devices or any other suitable devices. For example, the interface 130 may include an interface with an ethernet cable to a modem, which is used to communicate with an internet service provider (ISP) directing traffic to and from user devices and/or other parties. The interface 130 may also be used to communicate with another device within the network to which the system 100 is coupled, such as a smartphone, a tablet, a personal computer, or other suitable electronic device. The interface 130 may also include a display, a speaker, a mouse, a keyboard, or other suitable input or output elements that allow interfacing with the system 100 by a local user or moderator.

The database 134 may store any data associated with the system 100, such as page attributes (e.g., a page identifier), selected pages, accessed pages, lists of pages, traversal sequences, graphs of traversal sequences, structural attributes of graphs, labels, annotations, classifications, algorithms, training data, validation data, user information, information associated with predictive features and/or feature values, among other suitable information, such as one or more system objects, JSON (JavaScript Object Notation) files, or any other appropriate data. The database 134 may be a part of or separate from the sequence database 138 and/or another appropriate physical or cloud-based data store. In some implementations, the database 134 may include a relational database capable of presenting information as data sets in tabular form and capable of manipulating the data sets using relational operators. The database 134 may use Structured Query Language (SQL) for queries and/or maintenance. The data sets described below may be in any suitable format for processing by the system 100. For example, the data may be included in one or more JSON files or objects. In another example, the data may be in SQL compliant data sets for filtering and sorting by the system 100 (e.g., by the processor 120).

The sequence database 138 may store data associated with pages, such as identifiers (IDs), traversal sequences, graphs of traversal sequences, structural attributes of graphs, among other appropriate data. In some implementations, each traversal sequence is stored as a list of pages, where each page is represented by a different ID. For example, each list of pages may include identifiers for a sequence of pages accessed (or "traversed" or "navigated") by a user in chronological order. As a non-limiting example, if a user accesses a first page having an ID 02, navigates to a second page having an ID 04, navigates back to the first page, and then navigates to a third page having an ID 08, the list of pages may indicate 02, 04, 02, 08. In some instances, each list may include a number of pages equal to a lookback length (e.g., 50), where the lookback length may be selected (e.g., by an administrator) such that the length of the traversal sequence is appropriately balanced with processing and memory resources. If a user traverses a number of pages less than the lookback length, the corresponding list of pages may be prepended with one or more placeholder pages to maintain a consistent length among the traversal sequences. As a non-limiting example, if the lookback length is 50 and a user traverses a total of 42 pages during a session and prior to being notified of a price to continue the session, the list of pages corresponding to the user's traversal sequence may include 8 placeholder pages each having a same placeholder ID (e.g., 0) followed by a chronological listing of the page IDs assigned to the 42 pages traversed by the user. As another non-limiting example, if the lookback length is 100 and a user traverses a total of 108 pages during a session, the list of pages corresponding to the user's traversal sequence may include 0 placeholder pages and a chronological listing of the page IDs assigned to the most recent 100 pages traversed by the user.

The sequence database 138 may be a part of or separate from the database 134. In some instances, the sequence database 138 includes data stored in one or more cloud object storage services, such as one or more Amazon Web Services (AWS)-based Simple Storage Service (S3) buckets. In some implementations, all or a portion of the data may be stored in a memory separate from the sequence database 138, such as in the database 134 or another suitable data store. In some implementations, one or more of the database 134 or the sequence database 138 stores data indicative of pages being traversed in real-time, as further described below in connection with the detection engine 160 and the prediction engine 162.

The acquisition engine 140 may be used to retrieve, or otherwise acquire, traversal sequences associated with users, such as from one or more of the database 134, the sequence database 138, the interface 130, or another appropriate source. As described above, each traversal sequence may include a chronological list of pages accessed by the associated user during a session and prior to being notified of a price to continue the session. In some instances, such as if the user accessed one or more additional pages after being notified of the price, the list of pages may further include at least one of the additional pages.

The acquisition engine 140 may also be used to label each traversal sequence based on whether the associated user terminated the session upon being notified of the price. For example, the acquisition engine 140 may assign a first label to a traversal sequence if the user terminated the session upon being notified of the price, and may assign a second label to the traversal sequence if the user accessed one or more additional pages after being notified of the price. For instance, if the traversal sequence indicates that the user did not access one or more pages after being notified of a price to continue the session (e.g., the user terminated the session upon being notified of the price), the acquisition engine 140 may label the traversal sequence as "churn," or if the traversal sequence indicates that the user accessed one or more pages after being notified of the price (e.g., the user did not immediately terminate the session upon being notified of the price), the acquisition engine 140 may label the traversal sequence as "continue." In some instances, one or more of the traversal sequences may be prelabeled (e.g., indicate whether the user terminated the session upon being notified of the price), as further described below in connection with the adaptation engine 158. The acquisition engine 140 may provide the acquired traversal sequences to one or more of the casting module 144, the feature engine 148, the database 134, or the sequence database 138.

The casting module 144 may be used to transform traversal sequences into corresponding graphs. In some implementations, the casting module 144 incorporates one or more aspects of a sequence casting function. Each graph may include a number of nodes equal to a number of pages (excluding duplicates) accessed by the associated user during the session. As a non-limiting example, if the traversal sequence indicates that the most recent 50 pages traversed by the user includes 14 duplicate pages, the corresponding graph may include 36 nodes, each mapped to a different identifier assigned to one of the non-duplicate pages. Each graph may also include a plurality of edges each connecting two of the nodes, where each edge represents an instance in which the user accessed the two pages associated with the nodes in succession. As a non-limiting example, if the traversal sequence indicates that the user directly navigated from a page having ID 48 to a page having ID 24, the corresponding graph may include at least a first node mapped to ID 48, a second node mapped to ID 24, and an edge connecting the first node to the second node. In some implementations, the edges are undirected and thus do not indicate an order in which the user successively navigated the two pages. As a non-limiting example, an edge connecting a node mapped to ID 16 to a node mapped to ID 32 may indicate that the user either directly navigated from the page having ID 16 to the page having ID 32 or directly navigated from the page having ID 32 to the page having ID 16. In some implementations, the edges are unweighted and do not individually indicate a number of instances that the user successively navigated the two pages. Rather, in some instances, the graph may connect two nodes with more than one edge, such as if the traversal sequence indicates that the user navigated the two nodes in succession more than once. As a non-limiting example, if a user navigates from a page having ID 21 to a page having ID 42 and then navigates back to the page having ID 21, the graph may include at least two undirected and unweighted edges connecting the node mapped to ID 42 with the node mapped to ID 21.

The casting module 144 may also be used to identify structural attributes of a graph, such as based on the nodes and edges included in the graph. The casting module 144 may advantageously refrain from using the IDs mapped to the nodes of a graph when identifying the structural attributes of the graph—that is, the casting module 144 may identify the structural attributes irrespective of the IDs mapped to the nodes. In this manner, the IDs assigned to the pages may be in any suitable format and may not necessarily be the same from graph-to-graph. For example, if a first user traverses a particular sequence of pages assigned particular IDs, and then a second user traverses the same particular sequence of pages after one or more of the accessed pages is assigned a different ID, the graph constructed from the first user's traversal sequence and the graph constructed from the second user's traversal sequence may have the same structural attributes. Example structural attributes that the casting module 144 may identify include, and are not limited to, at least one of a total number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, and a number of shortest paths that pass through each node in the graph.

The feature engine 148 may be used to define a number of predictive features based on the structural attributes. In some implementations, each of the predictive features suggests an extent to which the structural attributes of a given graph affect the corresponding user's sensitivity to price—that is, how a user's navigational patterns during a session impact a likelihood that the user will immediately terminate the session upon being notified of a price to continue the session. By defining the predictive features based on the structural attributes of the graphs, a user's price sensitivity may be assessed irrespective of the identifiers mapped to the nodes of the graph, as described above in connection with the casting module 144, and as further described below in connection with the training engine 150. Non-limiting examples of predictive features that the feature engine 148 may define are described below, and are to be understood as a non-limiting exemplary combination of predictive features that may be defined based on the structural attributes of a graph, where, in some other implementations, other suitable predictive features may be defined based on one or more of the identified structural properties.

As one example, the feature engine 148 may define a first predictive feature based on identifying a number of edges in a given graph and a maximum number of edges the graph can contain. For instance, the first predictive feature may be a ratio of the number of edges in the graph and the maximum number of edges the graph can contain. As another example, the feature engine 148 may define a second predictive feature based on identifying a number of loops in a given graph and a number of edges between each pair of nodes in the graph. For instance, the second predictive feature may be a binary value representative of whether the number of loops in the graph or the number of edges between each pair of nodes in the graph is greater than zero. As another example, the feature engine 148 may define a third predictive feature based on identifying a shortest path between each pair of nodes in a given graph. For instance, the third predictive feature may be a longest of the shortest paths between each pair of nodes in the graph. As another example, the feature engine 148 may define a fourth predictive feature based on identifying a number of edges along each shortest path in a given graph. For instance, the fourth predictive feature may be an average of the number of edges along each shortest path in the graph. As another example, the feature engine 148 may define a fifth predictive feature based on identifying a number of closed triplets in a given graph and a total number of triplets in the graph. For instance, the fifth predictive feature may be a ratio of the number of closed triplets in the graph and the total number of triplets in the graph. As another example, the feature engine 148 may define a sixth predictive feature based on identifying a length of each cycle in a given graph. For instance, the sixth predictive feature may be a shortest length among the lengths of each cycle in the graph. As another example, the feature engine 148 may define a seventh predictive feature based on identifying a highest distance between each node and each other node in a given graph. For instance, the seventh predictive feature may be a lowest of the highest distances between each node and each other node in the graph. As another example, the feature engine 148 may define an eighth predictive feature based on identifying a number of edges connected to each node in a given graph. For instance, the eighth predictive feature may be a number of edges connected to the node in the graph connected to the highest number of edges. As another example, the feature engine 148 may define a ninth predictive feature based on identifying a number of shortest paths that pass through each node in a given graph. For instance, the ninth predictive feature may be a number of shortest paths that pass through the node in the graph through which the highest number of shortest paths pass.

In some implementations, the combination of predictive features may be used as input feature segments for a ML algorithm, which may be referred to herein as a "sensitivity scoring algorithm," and may be used in conjunction with model training data generated based in part on labeled traversal sequences to determine optimal weights for defined predictive features to be incorporated into a predictive model for predicting, generating, or otherwise outputting, a likelihood that a user will terminate a session upon being notified of a price to continue the session based on the structural attributes of the graph corresponding to the user's traversal sequence during the session and prior to being notified of the price. In some implementations, the training engine 150 is used to generate the model training data from the labeled traversal sequences and the defined predictive features. For example, the training engine 150 may generate a table including one column for each of the defined predictive features and one row for each of the labeled traversal sequences, where the table may be used in conjunction with the ML algorithm and one or more loss functions to determine optimal weights for the defined predictive features, as further described below.

The training engine 150 may also be used to generate a predictive model (e.g., the predictive model 154) incorporating the optimal weights and trained to predict, given a particular sequence of pages traversed by a user during a session and prior to being notified of a price to continue the session, a likelihood that the user will terminate the session upon being notified of the price to continue the session. In some implementations, the training engine 150 may recursively and/or iteratively optimize an accuracy of the predictive model 154, such as based on one or more loss functions, until the accuracy at which the predictive model 154 predicts likelihoods is greater than a threshold. For example, the training engine 150 may use the ML algorithm in conjunction with the model training data and one or more loss functions to determine a statistically most optimal (and/or optimum above a threshold) weighting factor for each of the predictive features, and incorporate the optimized weighting factors into the predictive model 154. The predictive model 154 may incorporate one or more aspects of, for example, random forests, logistic regression, one or more decision trees, nearest neighbors, classification trees, control flow graphs, support vector machines, naïve Bayes, Bayesian Networks, value sets, hidden Markov models, or neural networks configured to generate predictions for the intended purpose. In some aspects, the predictive model 154 may incorporate aspects of a neural network of a suitable type, such as a feedforward neural network or a recurrent neural network. For example, the predictive model 154 may incorporate aspects of a deep neural network (DNN), which may have a suitable architecture, such as a feedforward architecture or a recurrent architecture. In some other implementations, the predictive model 154 may incorporate aspects of a forecasting model such that predictive values are generated based at least in part on previous values associated with one or more input features, including interaction input features. Example forecasting models include one or more of an autoregressive (AR) model or a window function. Example AR models to predict values from time series data include an autoregressive integrated moving average (ARIMA) model, Fakebook's Prophet model, or an exponential smoothing model. Example window functions may include a simplified moving average, an exponential moving average, stochastic based smoothing, or a naive forecasting model. Predictions by an example window function may be based on one or more of a mean, a minimum, or a maximum of a predefined number of values in a time series data preceding a predicted value. It is to be understood that the predictive model 154 may incorporate aspects of any number of classification or regression models, and is not limited to the provided examples or a particular model type.

The adaptation engine 158 may be used to determine an accuracy at which the predictive model 154 predicts a likelihood that a user will terminate a session upon being notified of a price to continue—that is, the user's sensitivity to price. In some implementations, the adaptation engine 158 may recursively and/or iteratively optimize an accuracy of the trained predictive model 154, such as based on one or more loss functions, until the accuracy at which the optimized predictive model 154 predicts likelihoods is greater than a new threshold higher than the original training threshold. In some aspects, the training engine 150 and/or the adaptation engine 158 uses the ML algorithm in conjunction with the model training data and one or more loss functions to determine a statistically most optimal weighting factor for each of the predictive features, and incorporates the optimized weighting factors into the predictive model 154. In some implementations, the training engine 150 and/or the adaptation engine 158 may use annotated traversal sequences to validate, further train, or otherwise optimize, the predictive model 154 to generate likelihoods with even greater accuracy. In some aspects, the prelabeled traversal sequences are other traversal sequences navigated by other users during other sessions (e.g., the prelabeled traversal sequences described in connection with the sequence database 138 and the acquisition engine 140). The training engine 150 and/or the adaptation engine 158 may also update the statistically most optimal weighting factors for the predictive features based on the annotated traversal sequences. In some instances, the training engine 150 and/or the adaptation engine 158 may conserve time and resources when training the predictive model 154, such as by incorporating one or more aspects of a gradient boosting model, such as Light Gradient Boosting Machine (LightGBM). In some implementations, the adaptation engine 158 may retrieve the annotated traversal sequences from the sequence database 138. In some other implementations, the adaptation engine 158 may retrieve the annotated traversal sequences from the annotation engine 188, as further described below in connection with the action engine 184.

In these and other manners, the system 100 may be used to train a predictive model to assess a user's price sensitivity—that is, one or more of the acquisition engine 140, the casting module 144, the feature engine 148, the training engine 150, and the adaptation engine 158, may be used to train the predictive model 154 to predict, given a particular sequence of pages traversed by a user during a session and prior to being notified of a price to continue the session, a likelihood that the user will terminate the session upon being notified of the price, i.e., to predict the user's sensitivity to price in real-time. In addition, or in the alternative, the system 100 may be used to assess a user's price sensitivity—such as by using a trained predictive model in at least near real-time with the user being notified of the price—as further described below in connection with the detection engine 160, the prediction engine 162, the classification engine 174, the action engine 184, and the annotation engine 188.

The detection engine 160 may be used to determine that a user has been notified of a price. For example, the detection engine 160 may detect (e.g., in real-time via the interface 130) that a user, after traversing a particular sequence of pages during a session, has been notified of a price to continue the session. In some implementations, the price to continue the session is a cost to access additional content (e.g., additional pages), additional features (e.g., provided on additional pages), premium content requested and/or selected by the user, or the like. Upon detecting that the user has been notified of the price, the detection engine 160 may generate, or otherwise acquire (such as from the sequence database 138), a chronological list of pages accessed by the user prior to being notified of the price, i.e., the user's traversal sequence. In some instances, the detection engine 160 may provide the traversal sequence to the prediction engine 162 for further processing.

The prediction engine 162 may be used to transform the traversal sequence into a graph. The traversal sequence may be transformed into the graph in at least near real-time with the user being notified of the price. The graph may include a plurality of nodes each mapped to an identifier assigned to one of the pages of the traversal sequence. The graph may also include a plurality of edges each representing an instance in which the user successively accessed the associated pages—that is, the pages assigned the identifiers mapped to the nodes connected to the edge. The prediction engine 162 may use one or more aspects of a casting module to transform the traversal sequence into a graph, such as in the manners described above with respect to the casting module 144. The edges of the graph may be undirected and unweighted, such that various structural attributes of the graph may be identified irrespective of the identifiers mapped to its nodes. In some other implementations, the detection engine 160 transforms the traversal sequence into a graph in a same or similar manner, refrains from providing the traversal sequence to the prediction engine 162, and instead provides the graph to the prediction engine 162 for further processing.

The prediction engine 162 may also be used to identify structural attributes of the graph based on the nodes and edges, where the structural attributes are identified irrespective of the IDs mapped to the nodes. The structural attributes may be identified in at least near real-time with the user being notified of the price. In some instances, the prediction engine 162 uses a casting module to identify the structural attributes, such as in the manner described above with respect to the casting module 144. Example structural attributes include, and are not limited to, at least one of a total number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, and a number of shortest paths that pass through each node in the graph. In some other implementations, the detection engine 160 identifies the structural attributes of the graph in a same or similar manner, refrains from providing the graph to the prediction engine 162, and instead provides the structural attributes to the prediction engine 162 for further processing.

The prediction engine 162 may also be used to generate feature values for the traversal sequence, such as based on the structural attributes. The feature values may be generated in at least near real-time with the user being notified of the price. Each feature value may suggest an extent to which one or a combination of the structural attributes increase, decrease, or otherwise affect, a likelihood that the user is about to terminate the session in response to the price—that is, the user's current sensitivity to price. By generating the feature values irrespective of the IDs assigned to the associated pages, the prediction engine 162 may predict the likelihood that the user is about to terminate the session based on the user's navigational patterns and not based on the particular pages that the user accessed. In other words, the feature values generated for a first traversal sequence having particular structural attributes may be the same as the feature values generated for a second traversal sequence having the same particular structural attributes, even if one or more—including all—of the pages associated with the first traversal sequence are different than the pages associated with the second traversal sequence and/or accessed in a different order. Non-limiting examples of feature values that the prediction engine 162 may generate are described below, and are to be understood as a non-limiting exemplary combination of predictive feature values that may be generated based on the structural attributes, where, in some other implementations, other suitable predictive feature values may be generated based on one or more of the identified structural attributes.

As one example, the prediction engine 162 in conjunction with a predictive model (e.g., the trained predictive model 154) may generate a first feature value based on a ratio of the number of edges in the graph and the maximum number of edges the graph can contain. For instance, if the graph includes 44 edges and could contain up to 88 edges (based on the number of nodes), the predictive model 154 may generate a value of 0.5 for the first feature value. As another example, the prediction engine 162 in conjunction with the predictive model may generate a second feature value as a binary value representative of whether the number of loops in the graph or the number of edges between each pair of nodes in the graph is greater than zero. For instance, if the graph includes 0 loops and 1 edge between each pair of nodes, the predictive model 154 may generate a value of 1 for the second feature value. As another example, the prediction engine 162 in conjunction with the predictive model may generate a third feature value based on a longest of the shortest paths between each pair of nodes in the graph. For instance, given the length of the shortest path between each pair of nodes, the third feature value may be equal to the length of the longest shortest path. As another example, the prediction engine 162 in conjunction with the predictive model may generate a fourth feature value based on an average of the number of edges along each shortest path in the graph. For instance, given identified numbers of edges along each shortest path, the fourth feature value may be equal to the average of the identified numbers. As another example, the prediction engine 162 in conjunction with the predictive model may generate a fifth feature value based on a ratio of the number of closed triplets in the graph and the total number of triplets in the graph. For instance, if the graph includes 12 closed triplets and 48 triplets total, the predictive model 154 may generate a value of 0.25 for the fifth feature value. As another example, the prediction engine 162 in conjunction with the predictive model may generate a sixth feature value based on a shortest length among the lengths of each cycle in the graph. For instance, given a length of each cycle, the sixth feature value may be equal to the length of the shortest cycle. As another example, the prediction engine 162 in conjunction with the predictive model may generate a seventh feature value based on a lowest of the highest distances between each node and each other node in the graph. For instance, given the highest distances between nodes, the seventh feature value may be equal to the lowest highest distance. As another example, the prediction engine 162 in conjunction with the predictive model may generate an eighth feature value based on a number of edges connected to the node in the graph connected to the highest number of edges. For instance, given identified numbers of edges connected to each node, the eighth feature value may be equal to the highest of the identified numbers. As another example, the prediction engine 162 in conjunction with the predictive model may generate a ninth feature value based on a number of shortest paths that pass through the node in the graph through which the highest number of shortest paths pass. For instance, given identified numbers of shortest paths that pass through each node, the ninth feature value may be equal to the highest of the identified numbers.

The prediction engine 162 may also be used to predict, based on the generated feature values, a likelihood that the user is about to terminate the session. For example, the prediction engine 162 may use the combination of generated feature values (e.g., weighted with predetermined values) as input feature segments for a (non-linear) ML algorithm (e.g., the sensitivity scoring algorithm) incorporated into a predictive model, such as described above with respect to the predictive model 154. The trained predictive model may predict, or otherwise output, the likelihood in at least near real-time with the user being notified of the price. By generating the feature values irrespective of the IDs assigned to the associated pages, the likelihood (e.g., the user's relative sensitivity to price) may also be predicted irrespective of the IDs. In these and other manners, the prediction engine 162 may determine the user's imminent sensitivity to price in real-time with the user being notified of the price based on the structural attributes of the graph corresponding to the sequence of pages that the user traversed prior to being notified of the price. In some implementations, the prediction engine 162 may provide the predicted likelihood to the classification engine 174 for further processing.

The classification engine 174 may be used to classify the user associated with the traversal sequence as "at-risk" (of imminently terminating the session) or "not at-risk" (of imminently terminating the session). For example, the classification engine 174 may classify the user as at-risk if the predicted likelihood is greater than a threshold, and as not at-risk if the predicted likelihood is not greater than the threshold. In some implementations, the threshold is 0.5, such as to indicate that an at-risk user is more likely than not to imminently terminate the session, and vice versa. In some other implementations, the threshold may be a lower value, thus classifying relatively more users as at-risk, or the threshold may be a higher value, thus classifying relatively fewer users as at-risk. In some other implementations, the threshold may dynamically change based on system resources. For example, if the classification engine 174 determines that a number of users greater than a value are concurrently using the system 100, the classification engine 174 may increase the threshold. In some implementations, the classification engine 174 may provide the user's classification to the action engine 184 for further processing. In addition, or in the alternative, the classification engine 174 may provide the user's classification—and in some instances, the predicted likelihood—to the annotation engine 188 for further processing.

The action engine 184 may be used to perform one or more actions based on the user's classification. For example, the action engine 184 may selectively perform one or more preemptive actions in an attempt to prevent the user from terminating the session if the user is classified as "at-risk," and may refrain from performing one or more preemptive actions if the user is classified as "not at-risk." In some implementations, the one or more preemptive actions include transforming the original (or "standard") price to continue the session into a strategically reduced (or "preemptive") price. For example, if the user is predicted to terminate the session when presented with the standard price, the action engine 184 may offer the user a discount by transforming the "standard price" into a "strategic price" (e.g., 35%) less than the standard price, and present, provide—or otherwise notify (e.g., via the interface 130)—the user of the strategic price in an attempt to prevent the user from terminating the session. In some implementations, the action engine 184 may dynamically adjust the strategic price based on the predicted likelihood of the user terminating the session, such as by lowering the strategic price (e.g., increasing the discount) when the predicted likelihood is relatively high, and vice versa. In some instances, the action engine 184 may notify the user of the strategic price and refrain from notifying the user of the original price. In some other instances, the action engine 184 may notify an "at-risk" user of the standard price before the strategic price, the strategic price before the standard price, or the standard price simultaneously with the strategic price. The action engine 184 may refrain from notifying a "not at-risk" user of the strategic price. In some implementations, if the user is predicted to terminate the session upon being notified of the price, the action engine 184 may offer the user, for example, a 100% discount on an otherwise-paid service, such as a live consultation with an expert.

The annotation engine 188 may be used to annotate the user's particular traversal sequence based on the user's classification and/or events data indicative of the user's subsequent behavior. The annotation engine 188 may retrieve the events data via the interface 130 and/or the detection engine 160. In some implementations, the events data may indicate at least one of whether the user was offered a discount (e.g., a "transformed price"), whether the user terminated the session upon being notified of a standard price, whether the user terminated the session upon being notified of the transformed price, whether the user accessed one or more additional pages after being notified of the transformed price, or whether the user accessed one or more additional pages after being notified of the standard price. In some implementations, the annotation engine 188 provides the annotated traversal sequence to at least one of a database (e.g., the sequence database 138), a training engine (e.g., the training engine 150), or an adaptation engine (e.g., the adaptation engine 158).

As an example, the annotation engine 188 may annotate the user's particular traversal sequence as "false-negative" if the user is classified as "not at-risk" and the events data indicates that the user terminated the session upon being notified of the original price. For this example, the "false-negative" traversal sequence may be used to optimize a predictive model (e.g., the trained predictive model 154) to predict a relatively higher likelihood of a future user terminating a session if the structural attributes of a graph of the future user's traversal sequence are relatively similar to the structural attributes of the graph of the "false-negative" traversal sequence.

As another example, the annotation engine 188 may annotate the user's particular traversal sequence as "false-positive" if the user is classified as "at-risk," the events data indicates that the user was not offered a reduced price (e.g., such as if the classification engine 174 refrained from providing the user's classification to the action engine 184), and the events data further indicates that the user accessed one or more additional pages after being notified of the standard price. For this example, the "false-positive" traversal sequence may be used to optimize the trained predictive model 154 to predict a relatively lower likelihood of a future user terminating a session if the structural attributes of a graph of the future user's traversal sequence are relatively similar to the structural attributes of the graph of the "false-positive" traversal sequence.

As another example, the annotation engine 188 may annotate the user's particular traversal sequence as "true-negative" if the user is classified as "not at-risk," the events data indicates that the user was not offered a reduced price, and the events data further indicates that the user accessed one or more additional pages after being notified of the standard price. For this example, the "true-negative" traversal sequence may be used to optimize the trained predictive model 154 to predict a relatively similar likelihood of a future user terminating a session if the structural attributes of a graph of the future user's traversal sequence are relatively similar to the structural attributes of the graph of the "true-negative" traversal sequence.

As another example, the annotation engine 188 may annotate the user's particular traversal sequence as "true-positive" if the user is classified as "at-risk," the events data indicates that the user was offered a reduced price (e.g., such as in lieu of being offered a standard price), and the events data further indicates that the user accessed one or more additional pages after being notified of the standard price. For this example, the "true-positive" traversal sequence may be used to optimize the trained predictive model 154 to predict a relatively similar likelihood of a future user terminating a session if the structural attributes of a graph of the future user's traversal sequence are relatively similar to the structural attributes of the graph of the "true-positive" traversal sequence.

In these and other manners, the system 100 may be used to assess a user's price sensitivity—that is, one or more of the detection engine 160, the prediction engine 162, the classification engine 174, the action engine 184, and the annotation engine 188, may be used to predict, using a predictive model generated using a machine learning process, a likelihood that a user will imminently terminate a session in response to being notified of a price to continue the session based on structural attributes identified in a graph corresponding to a particular sequence of pages traversed by the user during the session and prior to being notified of the price.

The acquisition engine 140, the casting module 144, the feature engine 148, the training engine 150, the adaptation engine 158, the detection engine 160, the prediction engine 162, the classification engine 174, the action engine 184, and/or the annotation engine 188 may be implemented in software, hardware, or a combination thereof. In some implementations, any one or more of the acquisition engine 140, casting module 144, feature engine 148, training engine 150, adaptation engine 158, detection engine 160, prediction engine 162, classification engine 174, the action engine 184, or the annotation engine 188 may be embodied in instructions that, when executed by the processor 120, cause the system 100 to perform operations. The instructions of one or more of said components and/or the sequence database 138, may be stored in the memory 122, the database 134, or a different suitable memory. The instructions may be in any suitable programming language format for execution by the system 100, such as by the processor 120. It is to be understood that the particular architecture of the system 100 shown in FIG. 1 is but one example of a variety of different architectures within which aspects of the present disclosure may be implemented. For example, in some other implementations, components of the system 100 may be distributed across multiple devices, included in fewer components, and so on. While the below examples of training a predictive model to assess a user's price sensitivity and/or assessing a user's price sensitivity in real-time are described with reference to the system 100, other suitable system configurations may be used.

Figure 2:
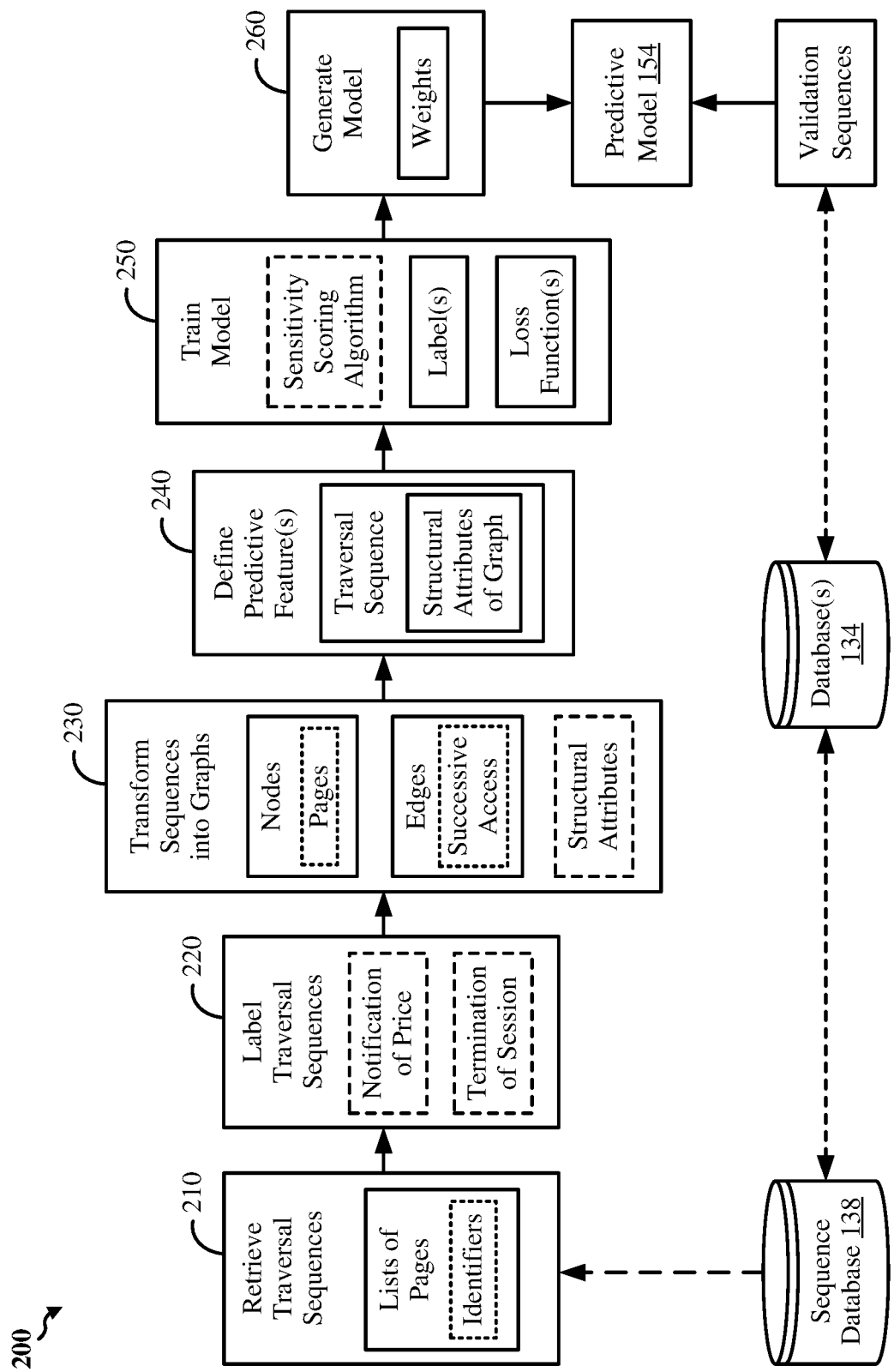
FIG. 2 shows a high-level overview of an example process flow that may be employed by a retention system, according to some implementations.

FIG. 2 shows a high-level overview of an example process flow 200 that may be employed by a retention system, according to some implementations, during which a predictive model (e.g., the predictive model 154) is trained to assess a user's price sensitivity. The retention system may be and/or incorporate one or more (including all) aspects described with respect to the system 100 shown in FIG. 1. In some other implementations, the retention system described with respect to FIG. 2 may not incorporate one or more aspects described with respect to the system 100 shown in FIG. 1, such as, in various implementations, the adaptation engine 158, the detection engine 160, the prediction engine 162, the classification engine 174, the action engine 184, and/or the annotation engine 188.

In some implementations, prior to block 210, the sequence database 138 may store one or more traversal sequences associated with users. In some implementations, each traversal sequence includes a chronological list of pages accessed by the associated user during a session and prior to being notified of a price to continue the session.

At block 210, the acquisition engine 140 retrieves one or more of the traversal sequences from the sequence database 138. In some implementations, each traversal sequence is stored as a list of pages, where each page is represented by a different ID, and each list of pages includes IDs for the sequence of pages traversed by the user in chronological order.

At block 220, the acquisition engine 140 labels each traversal sequence based on whether the associated user terminated the session upon being notified of the price. In some implementations, the acquisition engine 140 assigns a "churn" label to a traversal sequence if the user terminated the session upon being notified of the price, and assigns a "continue" label to the traversal sequence if the user accessed one or more additional pages after being notified of the price. In some instances, one or more of the traversal sequences may be prelabeled.

At block 230, the casting module 144 transforms the traversal sequences into corresponding graphs, where each graph includes a plurality of nodes each mapped to the ID assigned to the corresponding one of the pages accessed by the user during the session, and where each of the edges represents an instance in which the user successively accessed the pages represented by the connected nodes. In some implementations, the edges are undirected and unweighted. The casting module 144 may identify structural attributes of each graph irrespective of the IDs mapped to the nodes in the graph.

At block 240, the feature engine 148 defines a number of predictive features based on the structural attributes. Each of the predictive features may suggest an extent to which the structural attributes of the corresponding graph affect the associated user's sensitivity to price.

At block 250, the training engine 150 generates model training data from the labeled traversal sequences and the defined predictive features, and uses a machine learning algorithm in conjunction with the model training data and one or more loss functions to determine optimal weights for the defined predictive features.

At block 260, the training engine 150 generates a predictive model (e.g., the predictive model 154) incorporating the optimal weights and trained to predict a likelihood that a user will terminate a session upon being notified of a price to continue the session given a particular sequence of pages traversed by the user during the session and prior to being notified of the price. The training engine 150 may recursively and/or iteratively optimize an accuracy of the predictive model 154 until the accuracy at which the predictive model 154 predicts likelihoods is greater than a threshold.

In some implementations, after block 260, the training engine 150 and/or the adaptation engine 158 may determine an accuracy at which the predictive model 154 predicts a likelihood that a user will terminate a session upon being notified of a price to continue, i.e., the user's sensitivity to price. In some implementations, the training engine 150 and/or the adaptation engine 158 may iteratively optimize an accuracy of the predictive model 154 until the accuracy at which the predictive model 154 predicts likelihoods is greater than a threshold. The adaptation engine 158 may use annotated traversal sequences to validate, further train, or otherwise optimize, the predictive model 154 to predict likelihoods with even greater accuracy.

Figure 3:
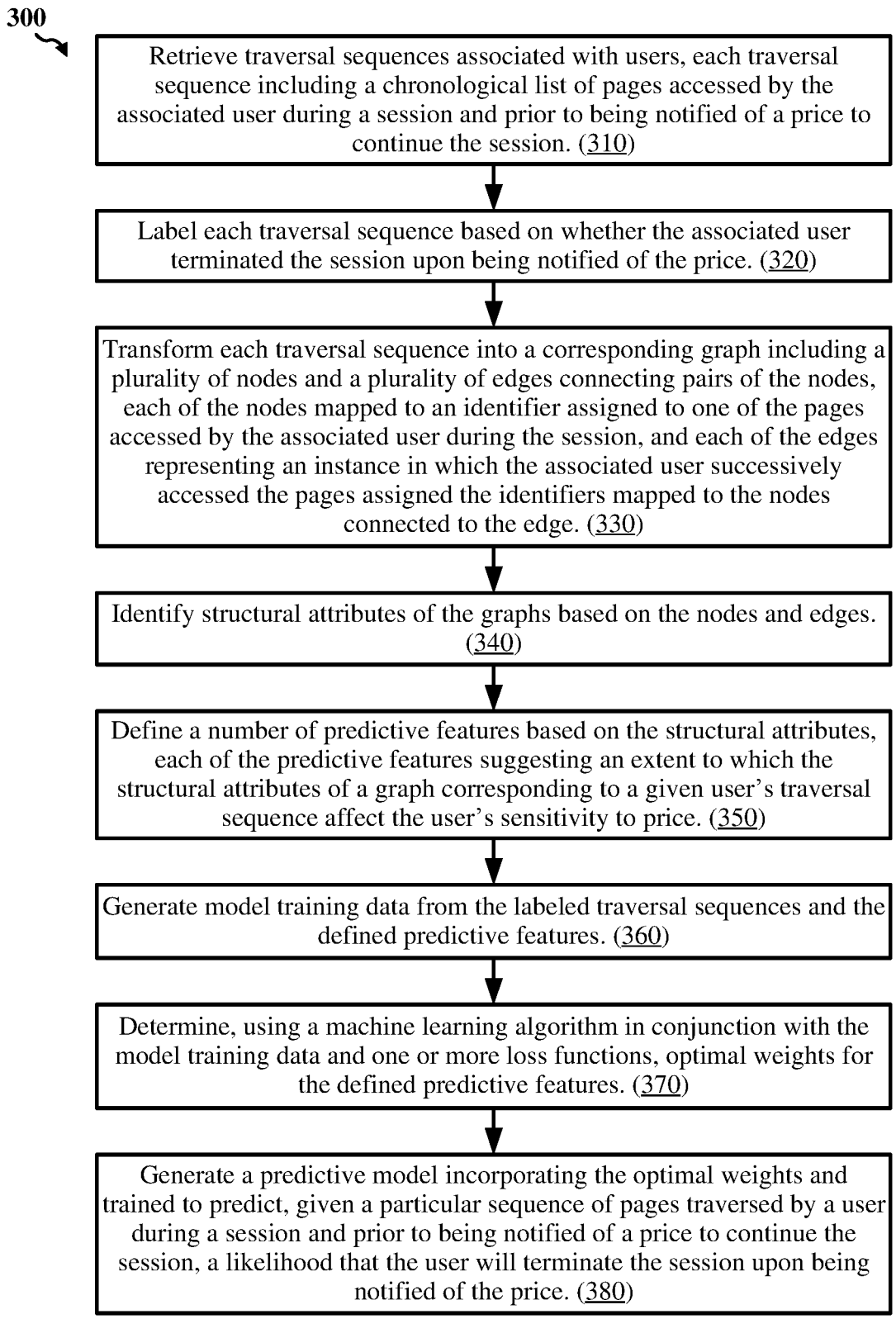
FIG. 3 shows an illustrative flowchart depicting an example operation for training a predictive model to assess a user's price sensitivity, according to some implementations.

FIG. 3 shows a high-level overview of an example process flow 300 that may be employed by the system 100 of FIG. 1 and/or the retention system described with respect to FIG. 2, according to some implementations, during which a predictive model (e.g., the predictive model 154) is trained to assess a user's price sensitivity.

At block 310, the acquisition engine 140 may retrieve traversal sequences associated with users, each traversal sequence including a chronological list of pages accessed by the associated user during a session and prior to being notified of a price to continue the session.

At block 320, the acquisition engine 140 may label each traversal sequence based on whether the associated user terminated the session upon being notified of the price.

At block 330, the casting module 144 may transform each traversal sequence into a corresponding graph including a plurality of nodes and a plurality of edges connecting pairs of the nodes, each of the nodes mapped to an identifier assigned to one of the pages accessed by the associated user during the session, and each of the edges representing an instance in which the associated user successively accessed the pages assigned the identifiers mapped to the nodes connected to the edge.

At block 340, the casting module 144 may identify structural attributes of the graphs based on the nodes and edges.

At block 350, the feature engine 148 may define a number of predictive features based on the structural attributes, each of the predictive features suggesting an extent to which the structural attributes of a graph corresponding to a given user's traversal sequence affect the user's sensitivity to price.

At block 360, the training engine 150 may generate model training data from the labeled traversal sequences and the defined predictive features.

At block 370, the training engine 150 may determine, using a machine learning algorithm in conjunction with the model training data and one or more loss functions, optimal weights for the defined predictive features.

At block 380, the training engine 150 may generate a predictive model incorporating the optimal weights and trained to predict, given a particular sequence of pages traversed by a user during a session and prior to being notified of a price to continue the session, a likelihood that the user will terminate the session upon being notified of the price.

Figure 4:
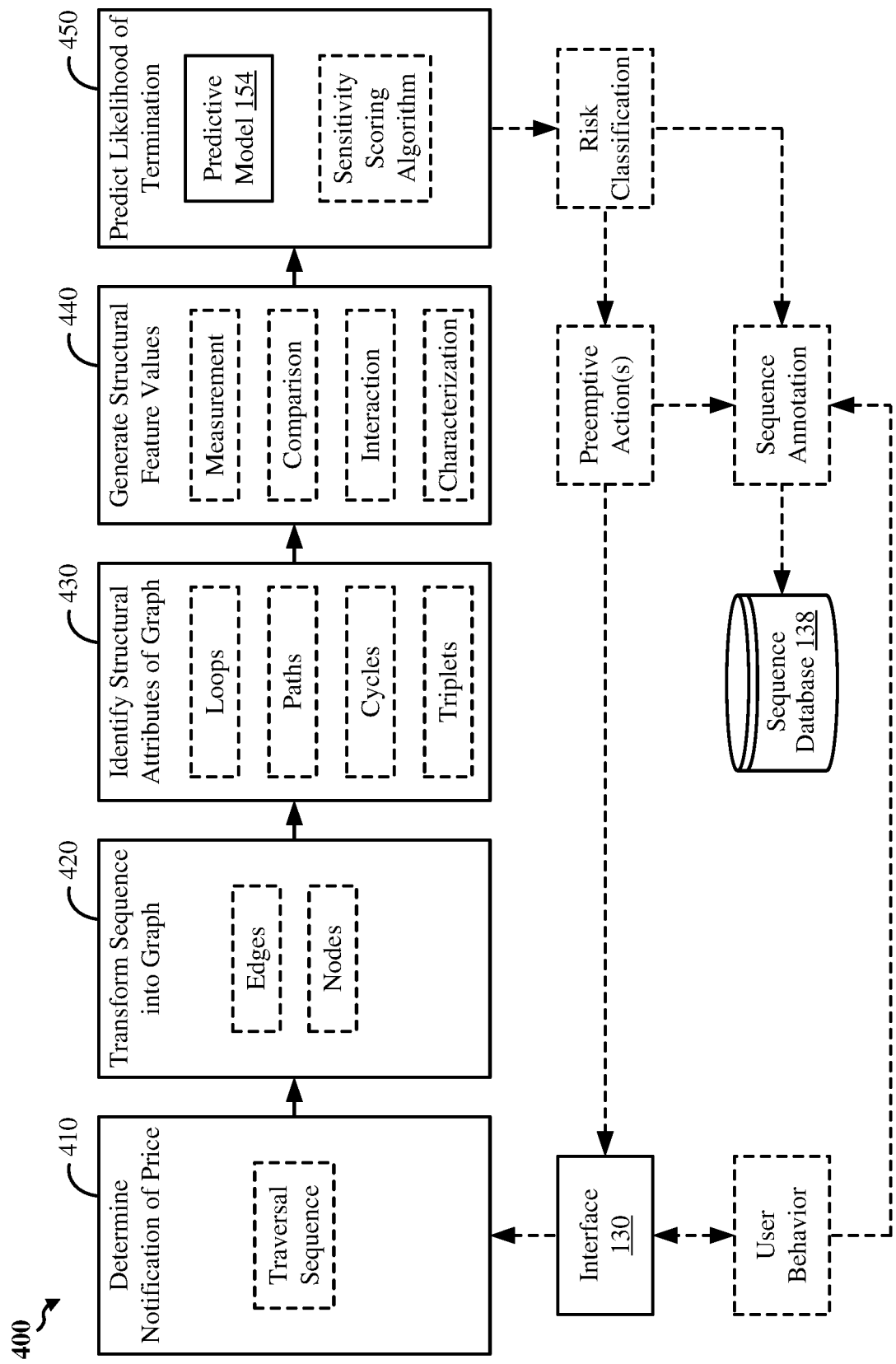
FIG. 4 shows a high-level overview of an example process flow that may be employed by a retention system, according to some implementations.

FIG. 4 shows a high-level overview of an example process flow 400 that may be employed by a retention system, according to some implementations, during which a trained predictive model (e.g., the predictive model 154) assesses a user's price sensitivity. The retention system may be and/or incorporate one or more (including all) aspects described with respect to the system 100 shown in FIG. 1. In some other implementations, the retention system described with respect to FIG. 4 may not incorporate one or more aspects described with respect to the system 100 shown in FIG. 1, such as, in various implementations, the acquisition engine 140, the casting module 144, the feature engine 148, the training engine 150, the adaptation engine 158, the classification engine 174, the action engine 184, and/or the annotation engine 188.

At block 410, the detection engine 160 determines, in real-time, that a user has been notified of a price to continue a session after traversing a particular sequence of pages during the session. In some implementations, the price to continue the session is a cost to access additional content or features.

At block 420, the detection engine 160 and/or the casting module 144 transforms the particular sequence of pages into a graph including a plurality of nodes each mapped to an identifier assigned to one of the pages and a plurality of edges each representing an instance in which the user successively accessed the pages represented by the connected nodes. The edges of the graph may be undirected and unweighted.

At block 430, the prediction engine 162 identifies structural attributes of the graph based on the nodes and edges, irrespective of the IDs mapped to the nodes. Example structural attributes include, and are not limited to, at least one of a total number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, and a number of shortest paths that pass through each node in the graph.

At block 440, the prediction engine 162 generates feature values for the traversal sequence based on the identified structural attributes. Each feature value may suggest an extent to which one or a combination of the structural attributes increase, decrease, or otherwise affect, a likelihood that the user is about to terminate the session in response to the price—that is, the user's current sensitivity to price. Non-limiting examples of feature values that the prediction engine 162 may generate are described with respect to the prediction engine 162 of FIG. 1.

At block 450, the prediction engine 162 uses a predictive model (e.g., the predictive model 154) generated using a machine learning process to predict a likelihood that, given the feature values generated for the traversal sequence, the user will imminently terminate the session in response to being notified of the price. The feature values may be used as input feature segments for the sensitivity scoring algorithm. In some implementations, one or more of the feature values are weighted using optimal values determined using a ML algorithm, such as the sensitivity scoring algorithm described in connection with FIG. 1.

In some implementations, after block 450, the classification engine 174 may classify the user associated with the traversal sequence as at-risk or not at-risk based on whether the predicted likelihood is greater than a threshold. In some implementations, the action engine 184 may selectively perform one or more preemptive actions in an attempt to prevent the user from terminating the session if the user is classified as at-risk, such as transforming the original price into a strategically reduced price (offering the user a discount), offering the user a free bonus service, or the like. In some other implementations, the annotation engine 188 annotates the user's particular traversal sequence based on the user's classification and/or data indicative of the user's behavior after being notified of the price. For example, the annotation engine 188 may annotate the particular traversal sequence as "false-negative," "false-positive," "true-negative," or "true-positive" in a same or similar manner as described with respect to the annotation engine 188 of FIG. 1.

FIG. 5 shows a high-level overview of an example process flow 500 that may be employed by the system 100 of FIG. 1 and/or the retention system described with respect to FIG. 4, according to some implementations, during which a trained predictive model (e.g., the predictive model 154) assesses a user's price sensitivity.

At block 510, the detection engine 160 may determine that a user has been notified of a price to continue a session after traversing a particular sequence of pages during the session.

At block 520, the system 100 may transform the particular sequence of pages into a graph including a plurality of nodes each mapped to an identifier assigned to one of the pages and a plurality of edges each representing an instance in which the user successively accessed the pages assigned the identifiers mapped to the nodes connected to the edge.

At block 530, the system 100 may identify structural attributes of the graph based on the nodes and edges.

At block 540, the prediction engine 162 may generate a number of feature values for the particular sequence of pages based on the structural attributes, the feature values suggesting an extent to which one or more structural attributes of the graph affect the user's current sensitivity to price.

At block 550, the prediction engine 162 may predict, using a predictive model generated using a machine learning process, a likelihood that, given the feature values generated for the particular sequence of pages, the user will imminently terminate the session in response to being notified of the price.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for training a predictive model to assess a user's current price sensitivity, the method performed by one or more processors of a retention system and comprising:

retrieving traversal sequences associated with users, each traversal sequence including a chronological list of pages accessed by the associated user during a session in which the user was presented with a notification about a price to continue the session;

assigning a first label or a second label to each traversal sequence based on whether the associated user terminated the session immediately upon being presented with the notification about the price to continue the session, the first label assigned if the associated user terminated the session immediately upon being presented with the notification about the price to continue the session, and the second label assigned if the associated user accessed one or more additional pages after being presented with the notification about the price to continue the session;

transforming each traversal sequence into a corresponding graph including a plurality of nodes and a plurality of edges connecting pairs of the nodes, each of the nodes mapped to an identifier assigned to one of the pages accessed by the associated user during the session in which the user was presented with the notification about the price to continue the session, and each of the edges representing an instance in which the associated user successively accessed the pages assigned the identifiers mapped to the nodes connected to the edge;

identifying structural attributes of the graphs based on the nodes and edges;

defining a number of predictive features based on the structural attributes, each of the predictive features suggesting an extent to which the structural attributes of a graph corresponding to a given user's navigational patterns during a session impact a likelihood that the given user is about to terminate the session immediately upon being presented with a notification about a price to continue the session;

generating model training data from the labeled traversal sequences and the defined predictive features;

training, using a machine learning algorithm in conjunction with the model training data, a predictive model to assess a user's current sensitivity to price based on being presented with a notification about a price to continue a session, the predictive model incorporating a set of weighting factors determined for the defined predictive features using one or more loss functions, and the predictive model trained to predict, given a particular sequence of pages traversed by the user during a current session in which the user is presented with a notification about a price to continue the current session, a likelihood that the user is about to terminate the current session immediately upon being presented with the notification about the price to continue the current session; and training the predictive model to classify the user's current price sensitivity, the user classified as at-risk of being about to terminate the current session due to price when the likelihood is greater than a threshold, and the user classified as not at-risk of being about to terminate the current session due to price when the likelihood is not greater than the threshold.

2. The method of claim 1, wherein the traversal sequences are retrieved from a sequence database, the chronological list of pages is prepended with one or more placeholder pages when a number of the accessed pages is less than a lookback length, a number of the placeholder pages is equal to the lookback length minus the number of the accessed pages, and each of the placeholder pages has a same placeholder identifier.

3. The method of claim 1, wherein each edge is undirected, each edge is unweighted, and the traversal sequences are transformed into the corresponding graphs using a sequence casting function.

4. The method of claim 1, wherein the structural attributes include, for each graph, at least one of a number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, or a number of shortest paths that pass through each node in the graph.

5. The method of claim 1, wherein the machine learning algorithm is non-linear, the predictive features are defined irrespective of the identifiers, and the predictive features are defined based on a combination of at least one of:

a number of edges in the given graph and a maximum number of edges the graph can contain, wherein the predictive features include at least a ratio of the number of edges and the maximum number of edges;

a number of loops in the given graph and a number of edges between each pair of nodes in the graph, wherein the predictive features include at least a binary value representative of whether the number of loops or the number of edges between each pair of nodes is greater than zero;

a shortest path between each pair of nodes in the given graph, wherein the predictive features include at least a longest of the shortest paths between nodes;

a number of edges along each shortest path in the given graph, wherein the predictive features include at least an average of the number of edges along each shortest path;

a number of closed triplets in the given graph and a total number of triplets in the graph, wherein the predictive features include at least a ratio of the number of closed triplets and the total number of triplets;

a length of each cycle in the given graph, wherein the predictive features include at least a shortest length among the lengths of each cycle;

a highest distance between each node and each other node in the given graph, wherein the predictive features include at least a lowest of the highest distances between nodes;
a number of edges connected to each node in the given graph, wherein the predictive features include at least a highest number of edges connected to a node; or
a number of shortest paths that pass through each node in the given graph, wherein the predictive features include at least a highest number of shortest paths that pass through a node.

6. The method of claim 1, wherein the predictive model incorporates one or more aspects of a gradient boosting model.

7. The method of claim 1, further comprising:
determining, using validation data associated with prelabeled traversal sequences, an accuracy at which the predictive model can determine a user's current sensitivity to price based on being presented with a notification about a price to continue a session; and
training the predictive model, using other traversal sequences from other sessions, until an accuracy at which the predictive model can predict a likelihood that a user is about to terminate a session immediately upon being presented with a notification about a price to continue the session given a sequence traversed by the user during the session is greater than a training threshold.

8. The method of claim 7, further comprising:
iteratively validating and training the predictive model until the accuracy is greater than a threshold greater than the training threshold.

9. A system for training a predictive model to assess a user's current price sensitivity, the system comprising:
one or more processors; and
at least one memory coupled to the one or more processors and storing instructions that, when executed by the one or more processors, cause the system to perform operations including:
retrieving traversal sequences associated with users, each traversal sequence including a chronological list of pages accessed by the associated user during a session in which the user was presented with a notification about a price to continue the session;
assigning a first label or a second label to each traversal sequence based on whether the associated user terminated the session immediately upon being presented with the notification about the price to continue the session, the first label assigned if the associated user terminated the session immediately upon being presented with the notification about the price to continue the session, and the second label assigned if the associated user accessed one or more additional pages after being presented with the notification about the price to continue the session;
transforming each traversal sequence into a corresponding graph including a plurality of nodes and a plurality of edges connecting pairs of the nodes, each of the nodes mapped to an identifier assigned to one of the pages accessed by the associated user during the session in which the user was presented with the notification about the price to continue the session, and each of the edges representing an instance in which the associated user successively accessed the pages assigned the identifiers mapped to the nodes connected to the edge;
identifying structural attributes of the graphs based on the nodes and edges;
defining a number of predictive features based on the structural attributes, each of the predictive features suggesting an extent to which the structural attributes of a graph corresponding to a given user's navigational patterns during a session impact a likelihood that the given user is about to terminate the session immediately upon being presented with a notification about a price to continue the session;
generating model training data from the labeled traversal sequences and the defined predictive features;
training, using a machine learning algorithm in conjunction with the model training data, a predictive model to assess a user's current sensitivity to price based on being presented with a notification about a price to continue a session, the predictive model incorporating a set of weighting factors determined for the defined predictive features using one or more loss functions, and the predictive model trained to predict, given a particular sequence of pages traversed by the user during a current session in which the user is presented with a notification about a price to continue the current session, a likelihood that the user is about to terminate the current session immediately upon being presented with the notification about the price to continue the current session; and
training the predictive model to classify the user's current price sensitivity, the user classified as at-risk of being about to terminate the current session due to price when the likelihood is greater than a threshold, and the user classified as not at-risk of being about to terminate the current session due to price when the likelihood is not greater than the threshold.

10. The system of claim 9, wherein the traversal sequences are retrieved from a sequence database, the chronological list of pages is prepended with one or more placeholder pages when a number of the accessed pages is less than a lookback length, a number of the placeholder pages is equal to the lookback length minus the number of the accessed pages, and each of the placeholder pages has a same placeholder identifier.

11. The system of claim 9, wherein each edge is undirected, each edge is unweighted, and the traversal sequences are transformed into the corresponding graphs using a sequence casting function.

12. The system of claim 9, wherein the structural attributes include, for each graph, at least one of a number of edges in the graph, a maximum number of edges the graph can contain, a number of loops in the graph, a number of edges between each pair of nodes in the graph, a shortest path between each pair of nodes in the graph, a number of edges along each shortest path in the graph, a number of closed triplets in the graph, a total number of triplets in the graph, a length of each cycle in the graph, a highest distance between each node and each other node in the graph, a number of edges connected to each node in the graph, or a number of shortest paths that pass through each node in the graph.

13. The system of claim 9, wherein the machine learning algorithm is non-linear, the predictive features are defined irrespective of the identifiers, and the predictive features are defined based on a combination of at least one of:
a number of edges in the given graph and a maximum number of edges the graph can contain, wherein the predictive features include at least a ratio of the number of edges and the maximum number of edges;

a number of loops in the given graph and a number of edges between each pair of nodes in the graph, wherein the predictive features include at least a binary value representative of whether the number of loops or the number of edges between each pair of nodes is greater than zero;

a shortest path between each pair of nodes in the given graph, wherein the predictive features include at least a longest of the shortest paths between nodes;

a number of edges along each shortest path in the given graph, wherein the predictive features include at least an average of the number of edges along each shortest path;

a number of closed triplets in the given graph and a total number of triplets in the graph, wherein the predictive features include at least a ratio of the number of closed triplets and the total number of triplets;

a length of each cycle in the given graph, wherein the predictive features include at least a shortest length among the lengths of each cycle;

a highest distance between each node and each other node in the given graph, wherein the predictive features include at least a lowest of the highest distances between nodes;

a number of edges connected to each node in the given graph, wherein the predictive features include at least a highest number of edges connected to a node; or a number of shortest paths that pass through each node in the given graph, wherein the predictive features include at least a highest number of shortest paths that pass through a node.

14. The system of claim 9, wherein the predictive model incorporates one or more aspects of a gradient boosting model.

15. The system of claim 9, wherein execution of the instructions causes the system to perform operations further including:
determining, using validation data associated with prelabeled traversal sequences, an accuracy at which the predictive model can determine a user's current sensitivity to price based on being presented with a notification about a price to continue a session; and
training the predictive model, using other traversal sequences from other sessions, until an accuracy at which the predictive model can predict a likelihood that a user is about to terminate a session immediately upon being presented with a notification about a price to continue the session given a sequence traversed by the user during the session is greater than a training threshold.

16. The system of claim 9, wherein execution of the instructions causes the system to perform operations further including:
iteratively validating and training the predictive model until the accuracy is greater than a threshold greater than the training threshold.

17. The system of claim 9, wherein execution of the instructions causes the system to perform operations further including:
updating the weighting factors based on annotations assigned to the prelabeled traversal sequences.

18. A non-transitory computer-readable medium storing instructions that, when executed by at least one or more processors of a system, cause the system to perform operations including:
retrieving traversal sequences associated with users, each traversal sequence including a chronological list of pages accessed by the associated user during a session in which the user was presented with a notification about a price to continue the session;
assigning a first label or a second label to each traversal sequence based on whether the associated user terminated the session immediately upon being presented with the notification about the price to continue the session, the first label assigned if the associated user terminated the session immediately upon being presented with the notification about the price to continue the session, and the second label assigned if the associated user accessed one or more additional pages after being presented with the notification about the price to continue the session;
transforming each traversal sequence into a corresponding graph including a plurality of nodes and a plurality of edges connecting pairs of the nodes, each of the nodes mapped to an identifier assigned to one of the pages accessed by the associated user during the session in which the user was presented with the notification about the price to continue the session, and each of the edges representing an instance in which the associated user successively accessed the pages assigned the identifiers mapped to the nodes connected to the edge;
identifying structural attributes of the graphs based on the nodes and edges;
defining a number of predictive features based on the structural attributes, each of the predictive features suggesting an extent to which the structural attributes of a graph corresponding to a given user's navigational patterns during a session impact a likelihood that the given user is about to terminate the session immediately upon being presented with a notification about a price to continue the session;
generating model training data from the labeled traversal sequences and the defined predictive features;
training, using a machine learning algorithm in conjunction with the model training data, a predictive model to assess a user's current sensitivity to price based on being presented with a notification about a price to continue a session, the predictive model incorporating a set of weighting factors determined for the defined predictive features using one or more loss functions, and the predictive model trained to predict, given a particular sequence of pages traversed by the user during a current session in which the user is presented with a notification about a price to continue the current session, a likelihood that the user is about to terminate the current session immediately upon being presented with the notification about the price to continue the current session; and
training the predictive model to classify the user's current price sensitivity, the user classified as at-risk of being about to terminate the current session due to price when the likelihood is greater than a threshold, and the user classified as not at-risk of being about to terminate the current session due to price when the likelihood is not greater than the threshold.

19. The method of claim 1, wherein the predictive model is trained to classify the user's current price sensitivity in at least near real-time, the method further comprising training the predictive model to dynamically change the threshold for classifying users as at-risk based on system resources, wherein dynamically changing the threshold includes:
determining that a number of system users is greater than a first value or less than a second value;

increasing the threshold responsive to determining that the number of system users is greater than the first value or decreasing the threshold responsive to determining that the number of system users is less than the second value; and classifying relatively fewer users as at-risk of being about to terminate the current session due to price responsive to increasing the threshold or classifying relatively more users as at-risk of being about to terminate the current session due to price responsive to decreasing the threshold.

20. The method of claim 1, wherein the predictive model is trained to classify the user's current price sensitivity in at least near real-time, the method further comprising training the predictive model to selectively perform preemptive actions based on the user's classification, wherein selectively performing the preemptive actions includes:

performing the preemptive actions for preventing the user from terminating the current session responsive to classifying the user as at-risk of being about to terminate the current session due to price, wherein the preemptive actions include dynamically adjusting the price in proportion with the predicted likelihood that the user is about to terminate the session; and refraining from performing the preemptive actions responsive to classifying the user as not at-risk of being about to terminate the current session due to price.

* * * * *